United States Patent
Shiva et al.

(10) Patent No.: US 10,871,895 B1
(45) Date of Patent: Dec. 22, 2020

(54) MOBILE DEVICE MERCHANT AVAILABILITY INTERFACE

(71) Applicant: Groupon, Inc., Chicago, IL (US)

(72) Inventors: Arash Shiva, Seattle, WA (US); Joseph Hawilo, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 289 days.

(21) Appl. No.: 15/281,779

(22) Filed: Sep. 30, 2016

Related U.S. Application Data

(60) Provisional application No. 62/235,168, filed on Sep. 30, 2015.

(51) Int. Cl.
*G06F 3/0482* (2013.01)
*G06F 3/0488* (2013.01)
*G06F 3/0486* (2013.01)
*G06Q 20/20* (2012.01)
*G06F 3/0484* (2013.01)

(52) U.S. Cl.
CPC ........ *G06F 3/04883* (2013.01); *G06F 3/0482* (2013.01); *G06F 3/0486* (2013.01); *G06F 3/04842* (2013.01); *G06Q 20/20* (2013.01); *G06F 2203/04808* (2013.01)

(58) Field of Classification Search
CPC ............... G06F 3/0482; G06F 3/04842; G06F 3/04883; G06F 3/0486; G06F 2203/04808; G06Q 10/10; G06Q 20/20
See application file for complete search history.

(56) References Cited

U.S. PATENT DOCUMENTS

| | | | |
|---|---|---|---|
| 2015/0046271 A1 | 2/2015 | Scholl et al. | |
| 2015/0046276 A1 | 2/2015 | Artman et al. | |
| 2015/0234542 A1* | 8/2015 | Kirillov | G06F 3/0481 |
| | | | 715/800 |
| 2015/0378529 A1* | 12/2015 | Ramanathan | G06T 11/206 |
| | | | 715/834 |
| 2016/0034127 A1* | 2/2016 | Seo | G06F 3/04883 |
| | | | 715/769 |

OTHER PUBLICATIONS

U.S. Appl. No. 14/495,754, filed Sep. 24, 2014.
U.S. Appl. No. 14/495,750, filed Sep. 24, 2014.

* cited by examiner

*Primary Examiner* — Tuyetlien T Tran
(74) *Attorney, Agent, or Firm* — Alston & Bird LLP

(57) ABSTRACT

Techniques for providing merchant slot availability management using graphical user interfaces for mobile devices are discussed herein. Some embodiments may include a mobile device with processing circuitry configured to generate a multi-level graphical user interface (mGUI), and provide the mGUI to a touch screen display of the mobile device. The processing circuitry may be further configured to monitor a touch screen for various predefined user inputs for traversing tiered levels, and updating the mGUI. The mGUI may be used to implement interfaces various mobile device interfaces used for organizing hierarchal or structured data. For example, the mGUI may be used to implement a merchant slot management interface that allows merchants to dynamically adjust slot availability and associated properties, manage slots such as by creating tabs, or generate promotions for available slots.

18 Claims, 17 Drawing Sheets

MOBILE DEVICE MERCHANT AVAILABILITY INTERFACE

This application claims the benefit of U.S. Provisional Application No. 62/235,168 entitled "Mobile Device Merchant Availability Interface" filed Sep. 30, 2015, the contents of which is incorporated herein by reference in its entirety.

FIELD

Embodiments of the invention relate, generally, to facilitating management of merchant availability with a mobile device.

BACKGROUND

Graphical user interfaces (GUIs) designed for desktop computing are typically unsuitable for mobile devices. For example, desktops typically utilize larger monitors with keyboard and mouse inputs. To facilitate mobile device use, GUIs may be modified to accommodate smaller display screen sizes and touch screen inputs. This may include making buttons, font, and other interface features larger, rearranging interface elements, or scaling the GUI (e.g., to enable scrolling in only a single direction for larger GUIs), as well as making the GUI responsive to touch input rather than mouse clicks or keyboard inputs. However, such GUIs are not optimized for the various touch screen interactions that are possible on mobile devices. Furthermore, management of complex data (e.g., including hierarchal relationships) is cumbersome and unintuitive using existing GUIs on mobile devices.

BRIEF SUMMARY

Systems, methods, and computer readable program code are provided to, in general, improve mobile device graphical user interfaces, such as graphical user interfaces for merchant slot availability management on a mobile device of a merchant, or "merchant devices."

Some embodiments may include central system (e.g., one or more servers) or a merchant device configured to perform some or all of the functionality discussed herein. Some embodiments may include one or more methods discussed herein. Other embodiments may include one or more machines, such as an apparatus and/or system, configured to implement the methods and/or other functionality discussed herein. For example, the machine may include one or more processors and/or other machine components configured to implement the functionality discussed herein based on instructions and/or other data stored in memory and/or other non-transitory computer readable media.

These characteristics as well as additional features, functions, and details are described below. Similarly, corresponding and additional embodiments are also described below.

BRIEF DESCRIPTION OF THE DRAWINGS

Figure 1:
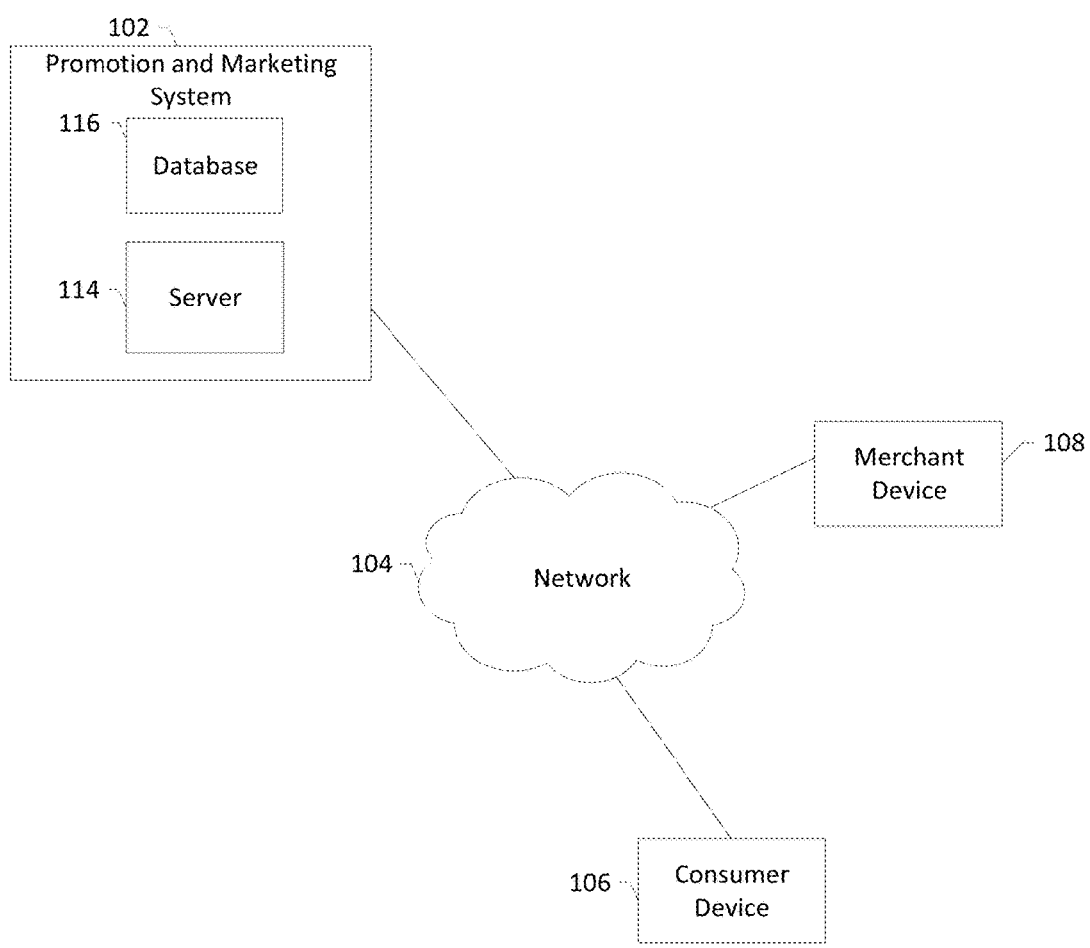
Figure 2:
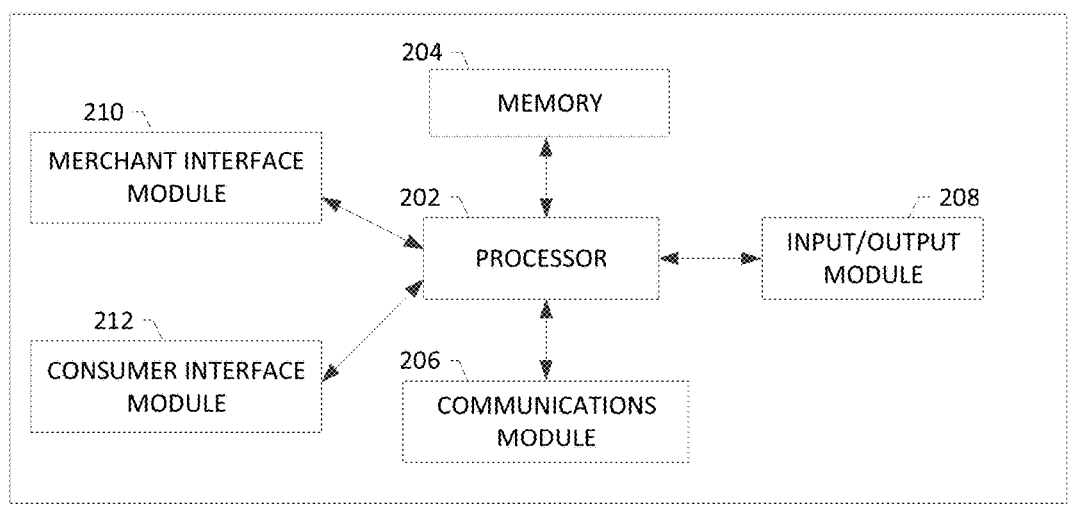
Figure 3:
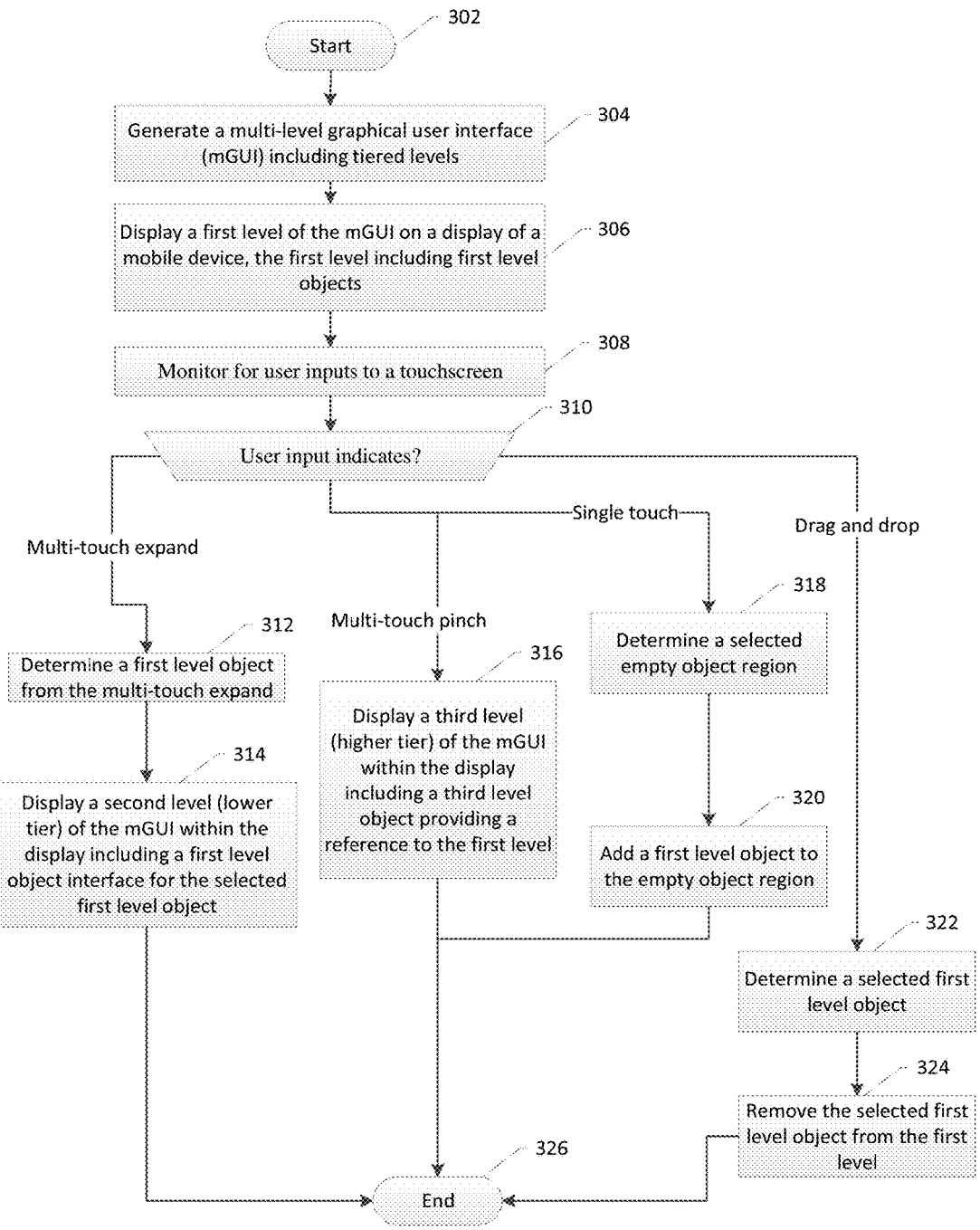
Figure 4:
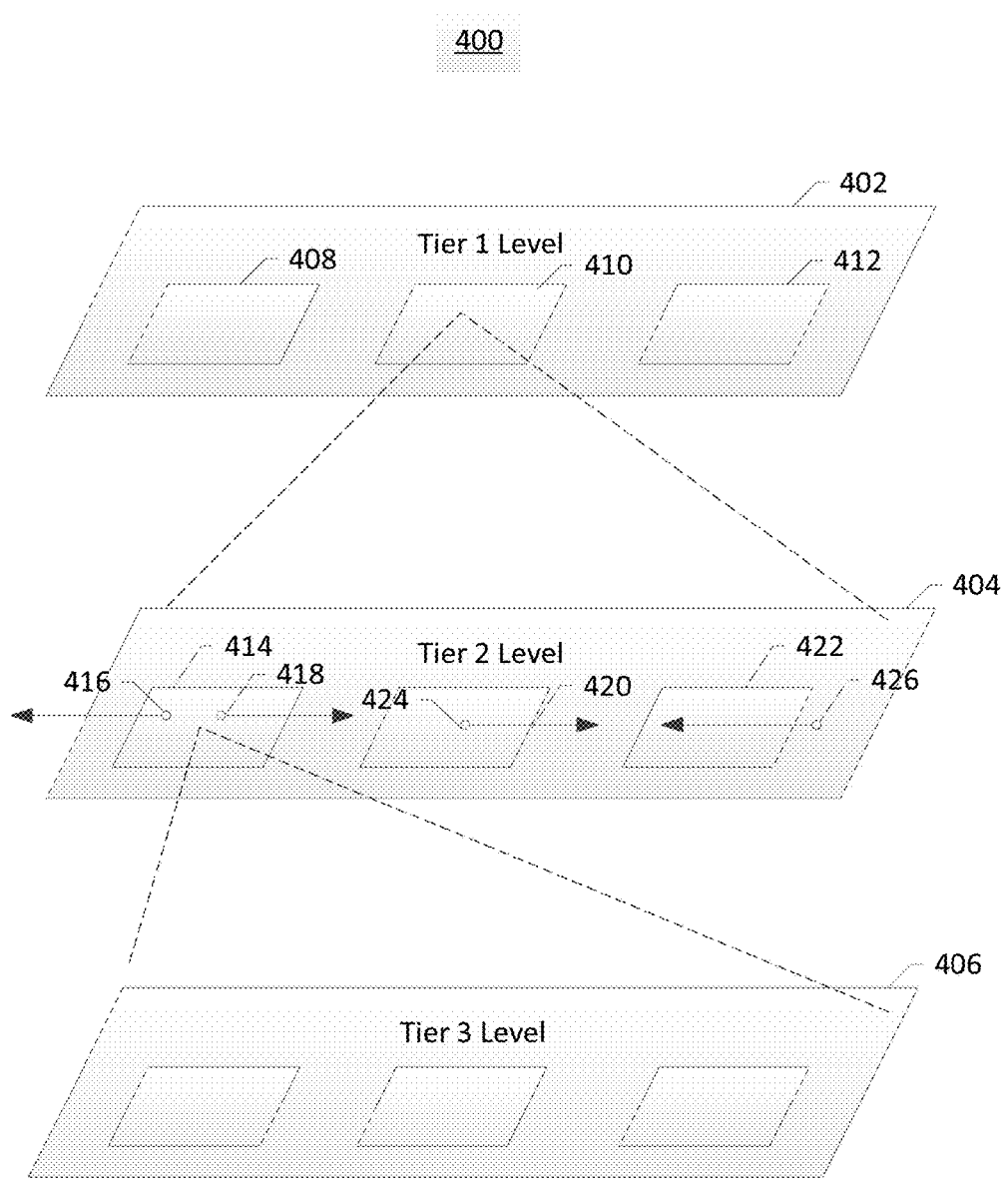
Figure 5:
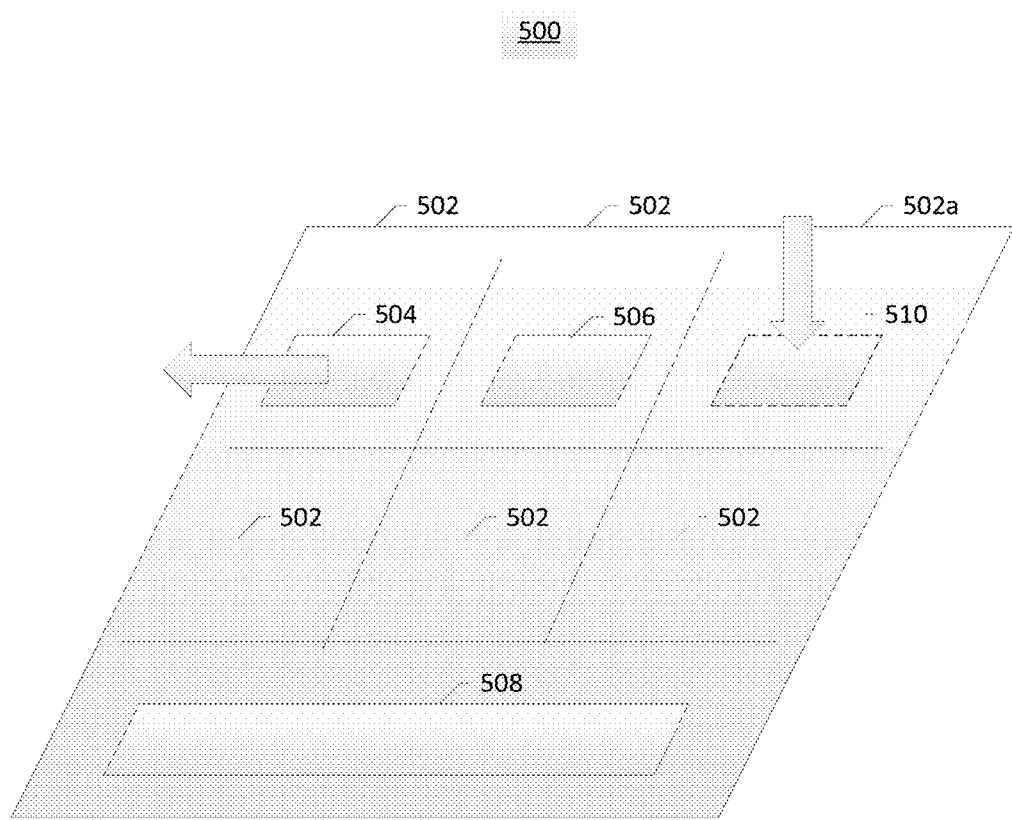
Figure 6:
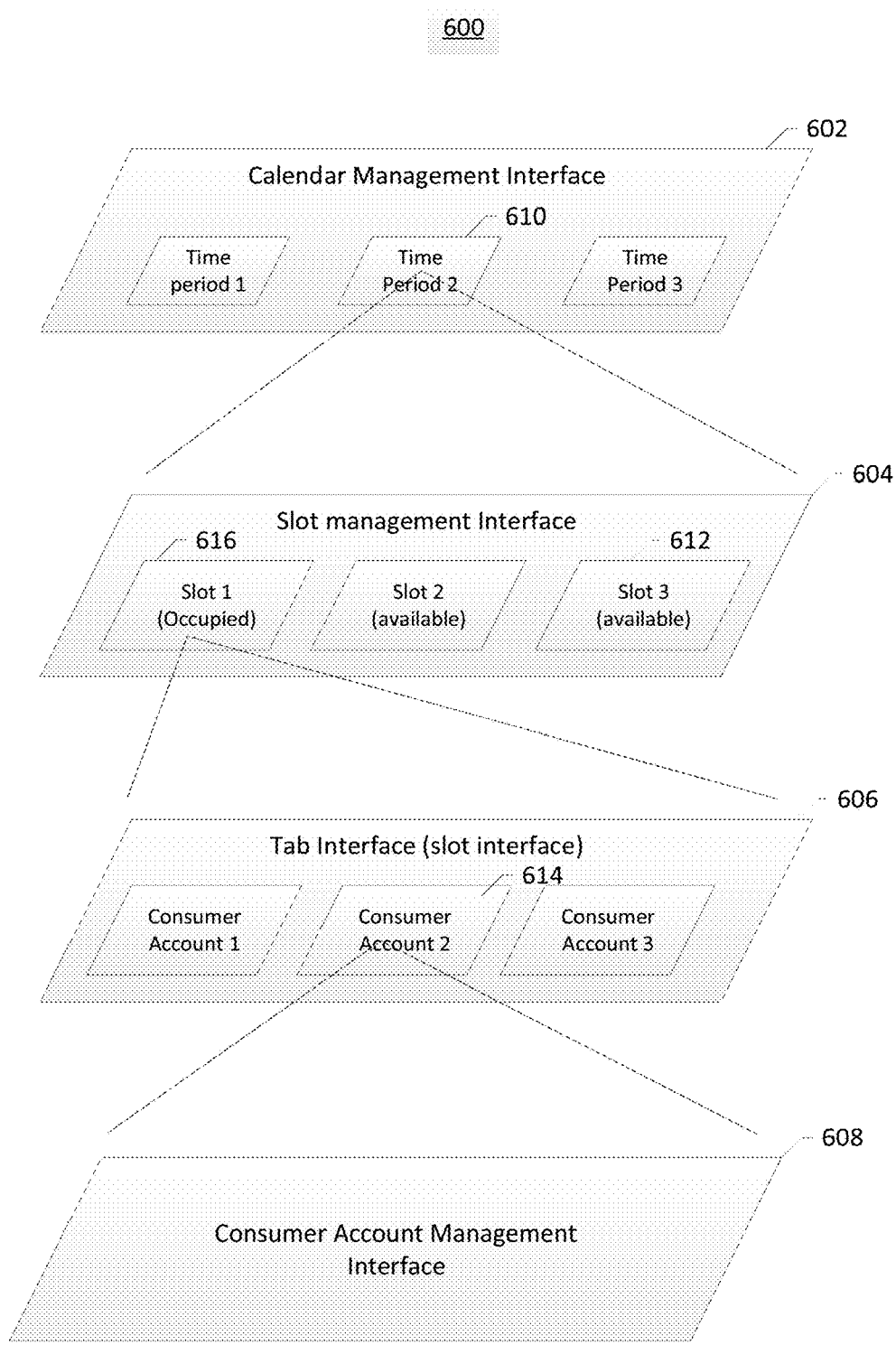
Figure 7:
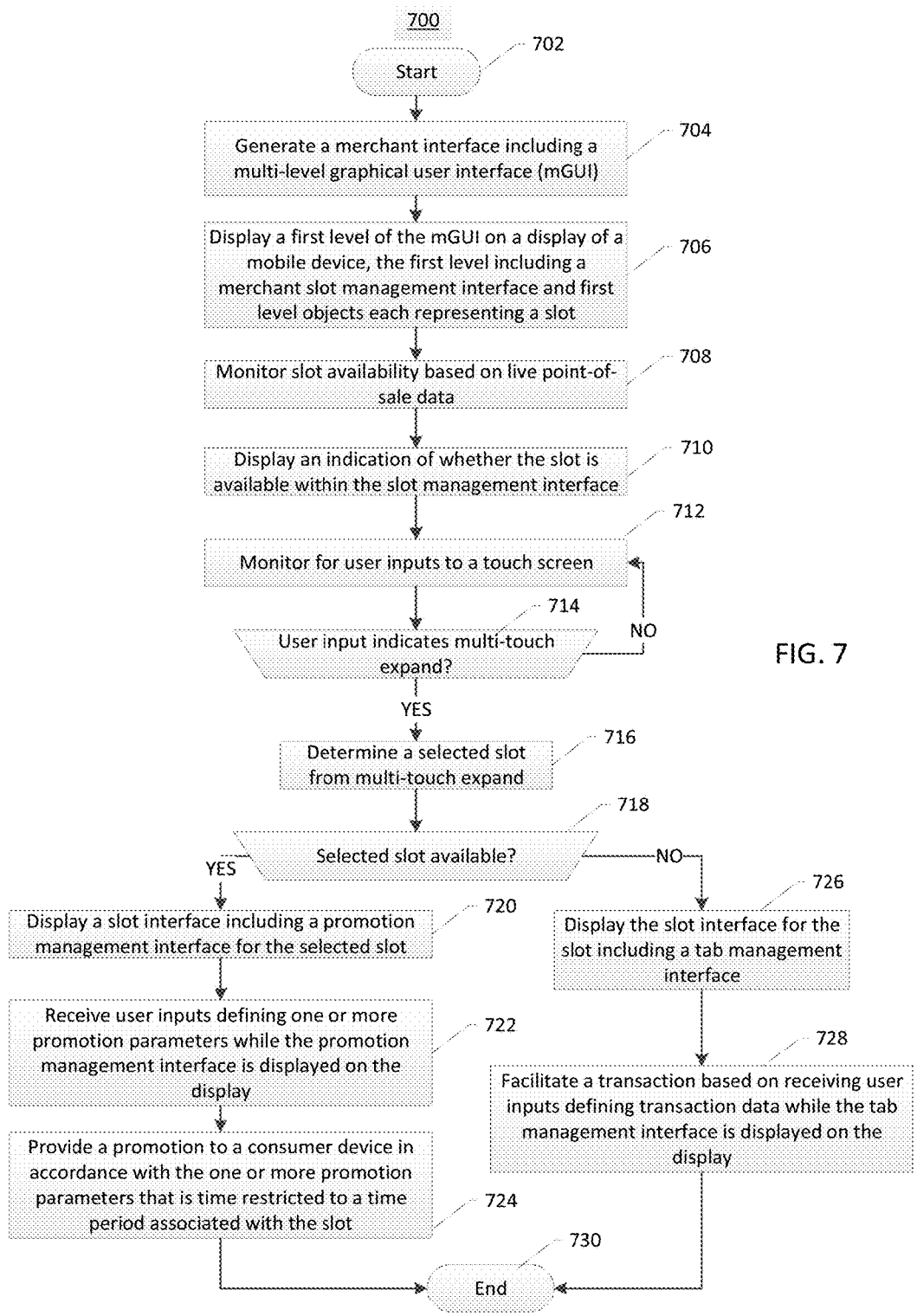
Figure 8:
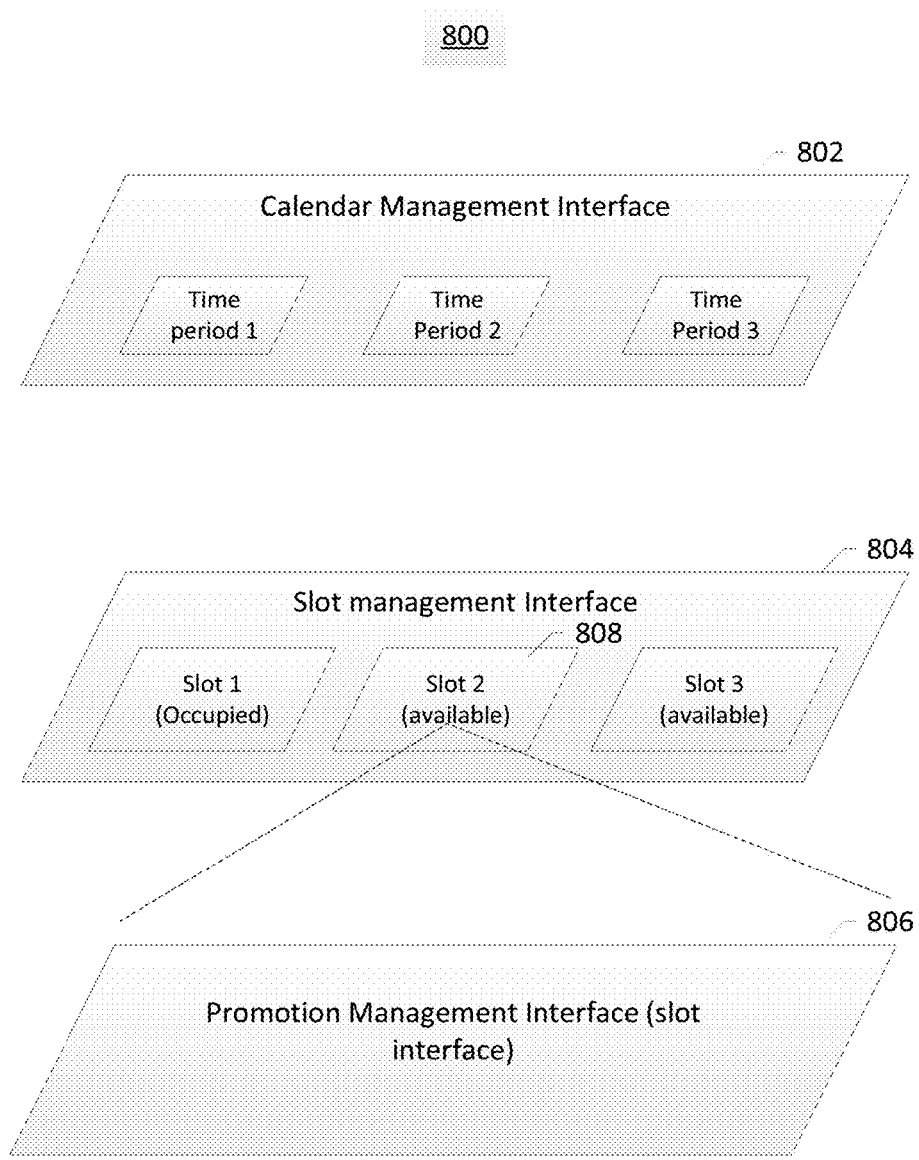
Figure 9:
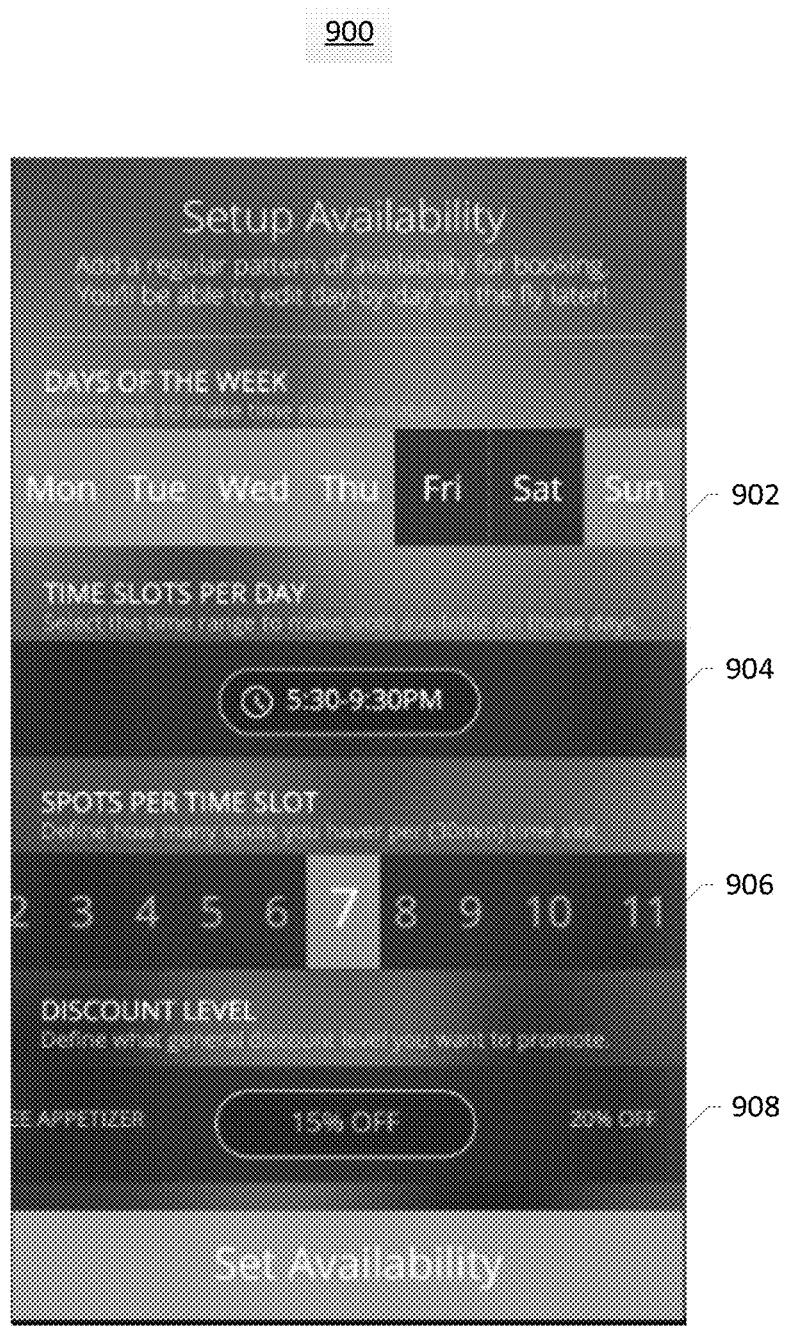
Figure 10:
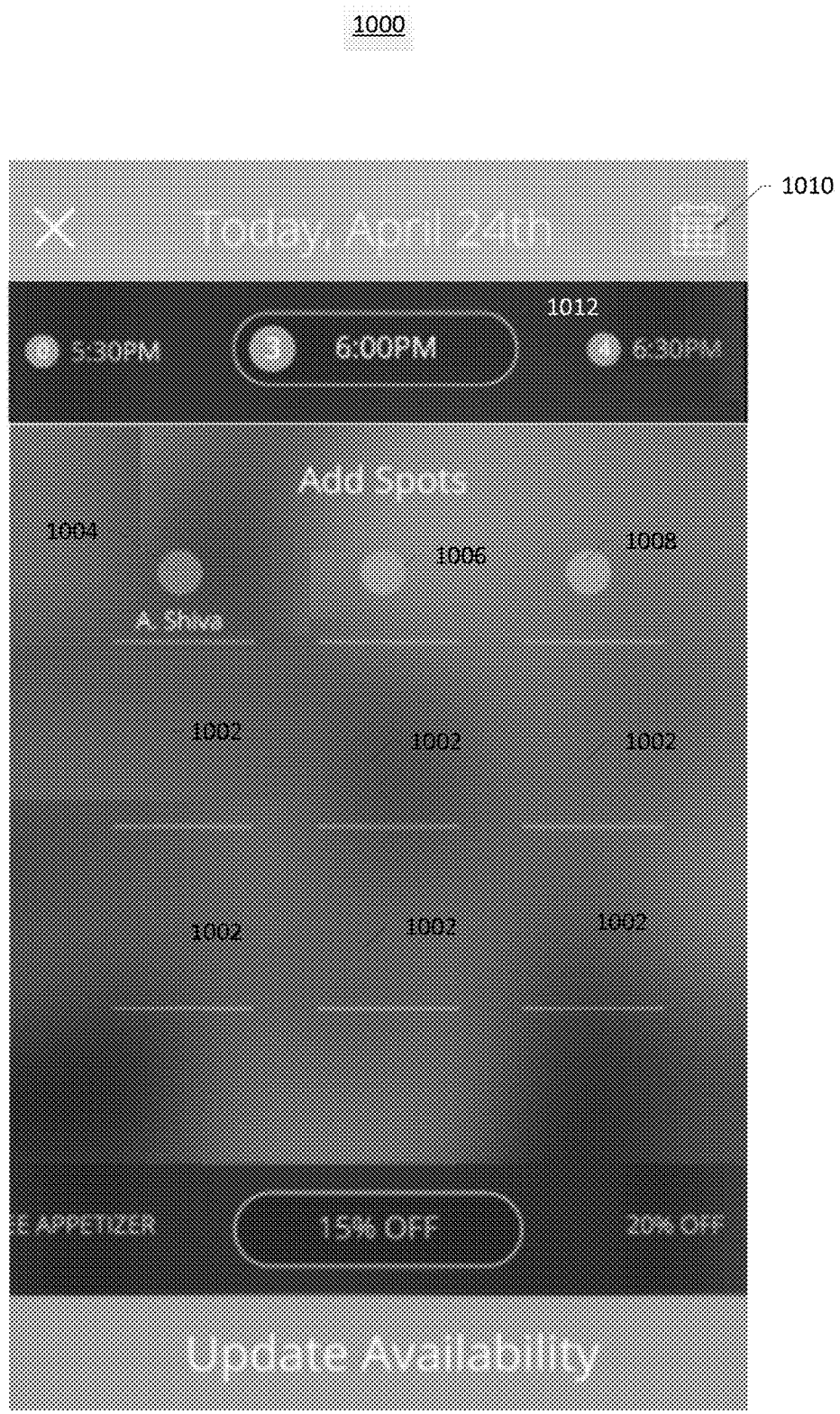
Figure 11:
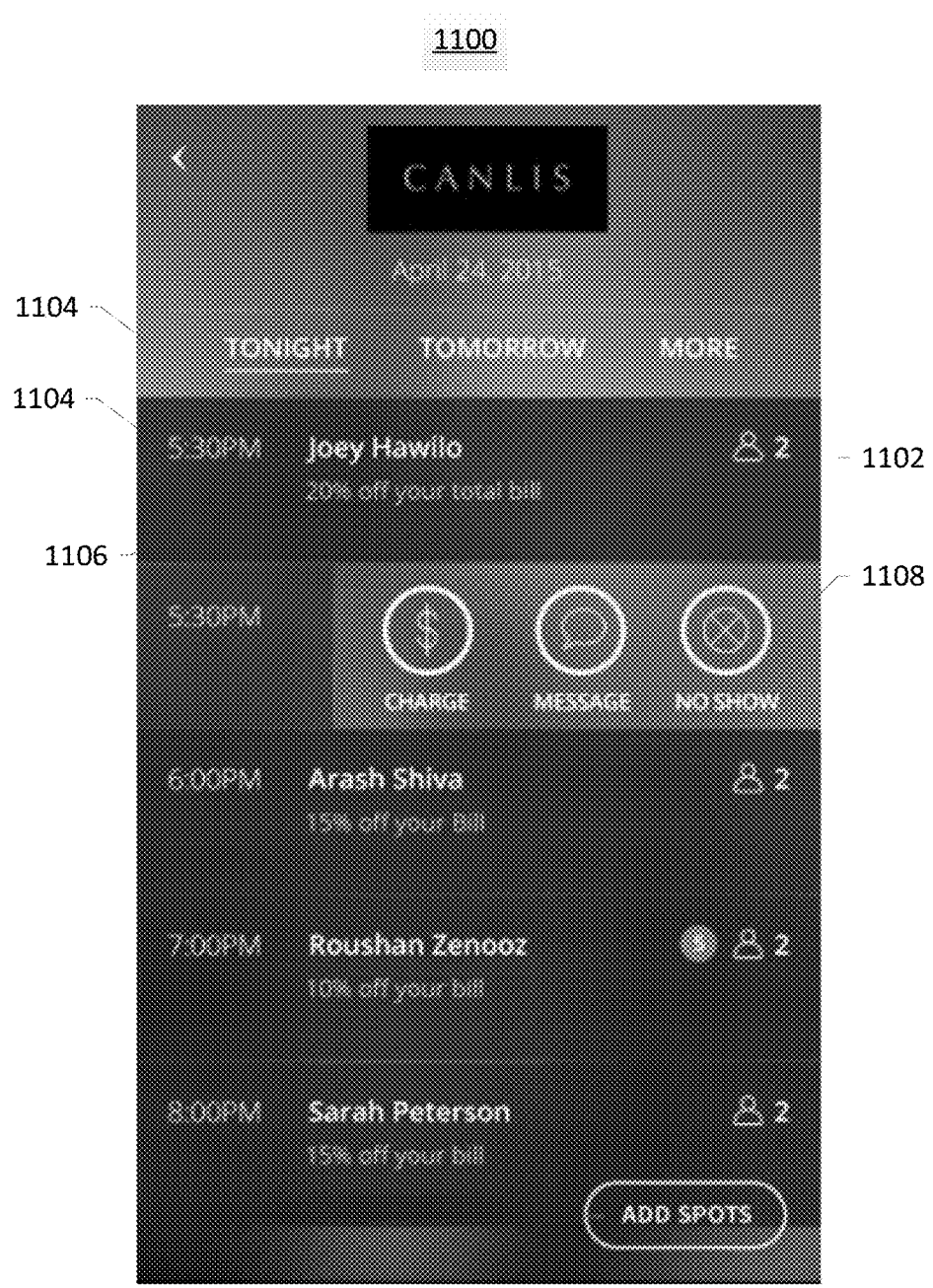
Figure 12:
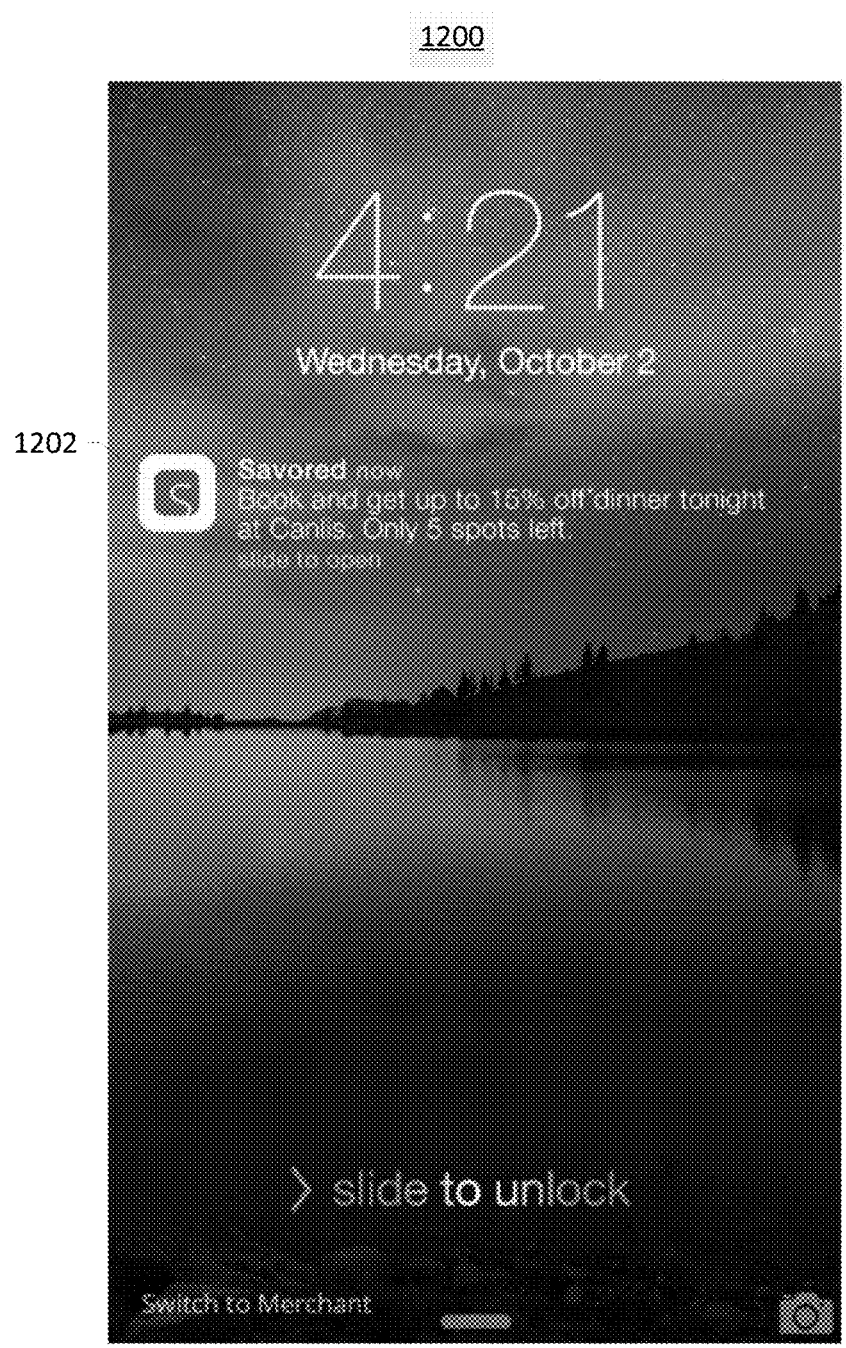
Figure 13:
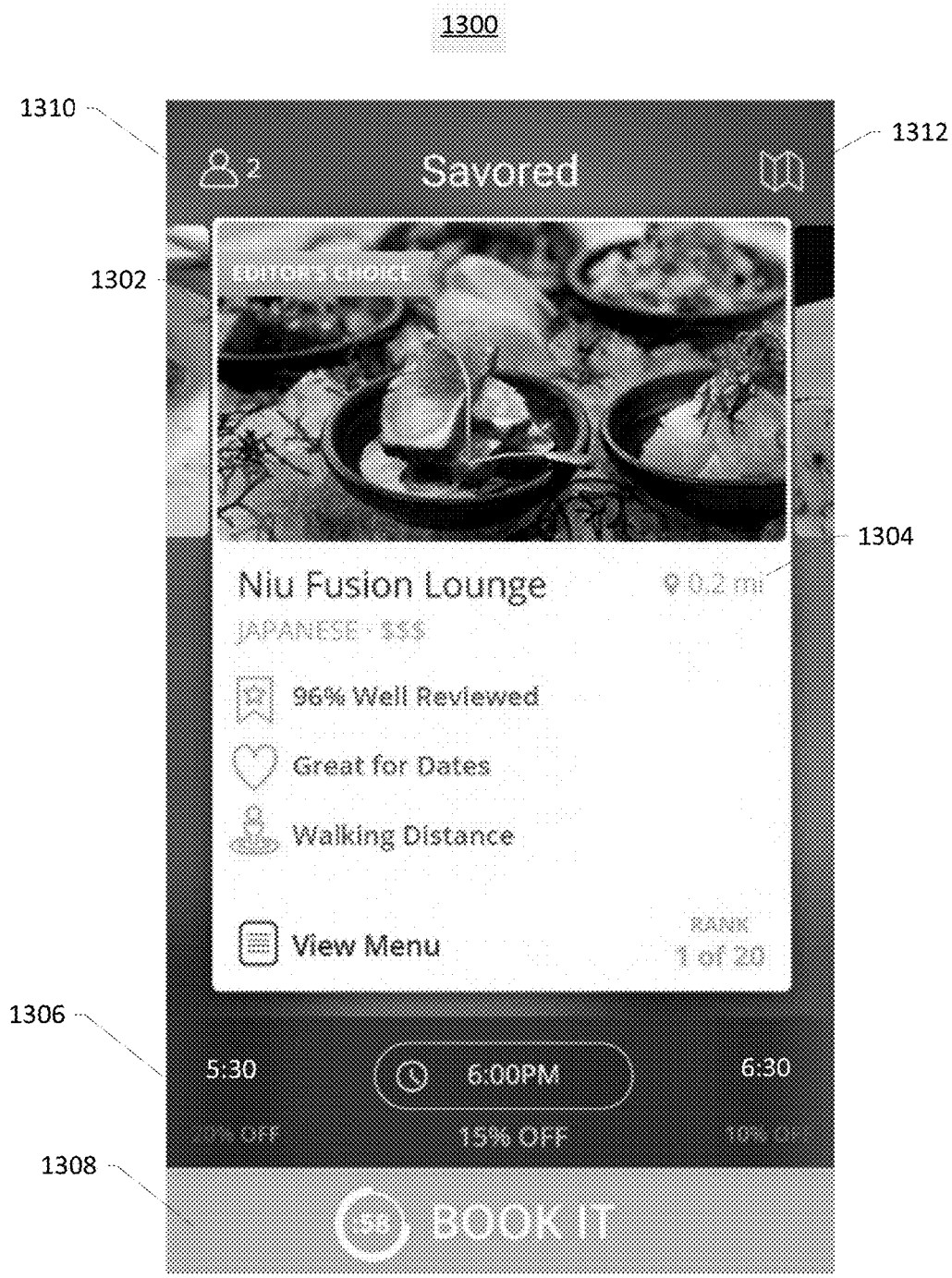
Figure 14:
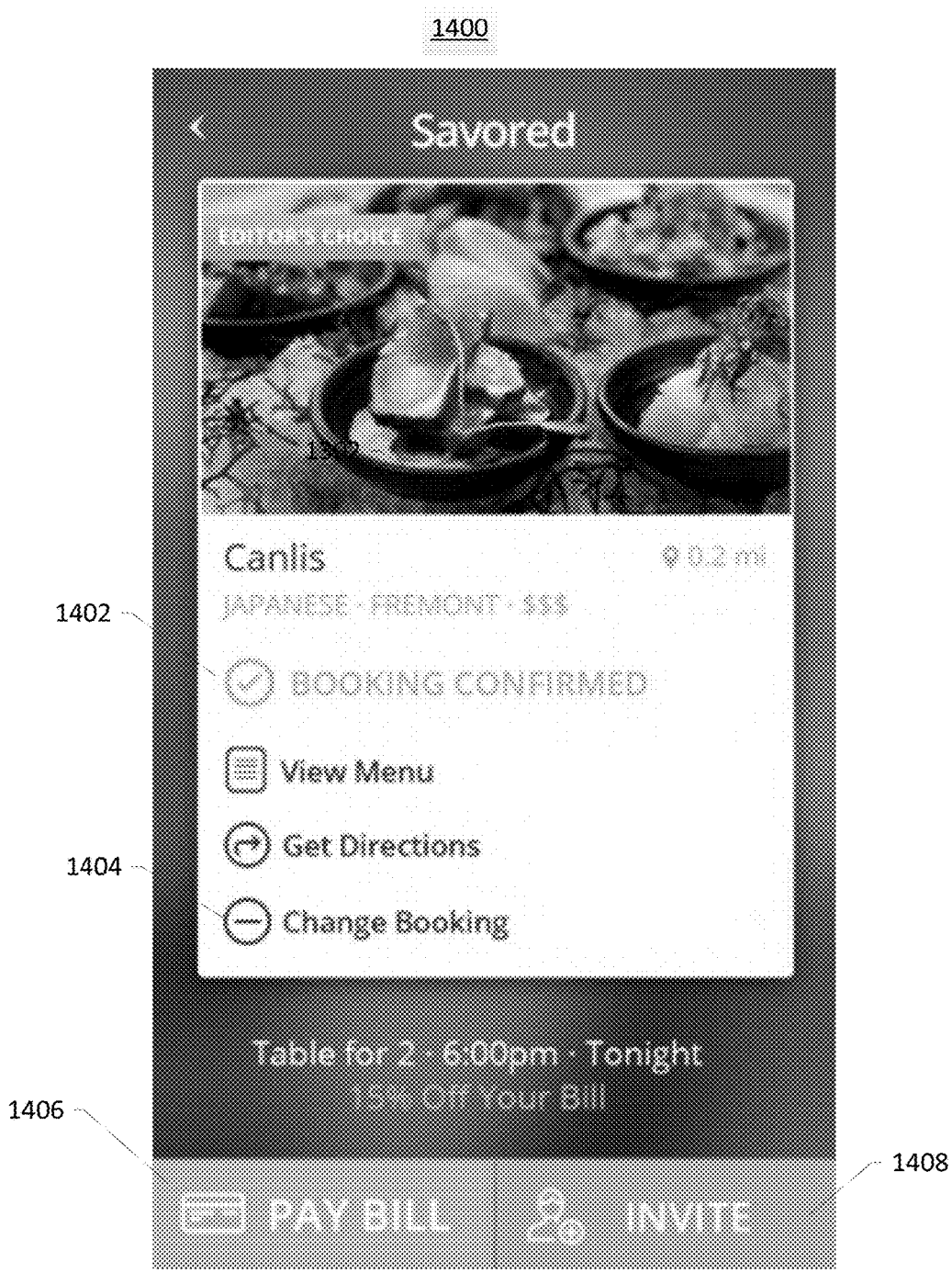
Figure 15:
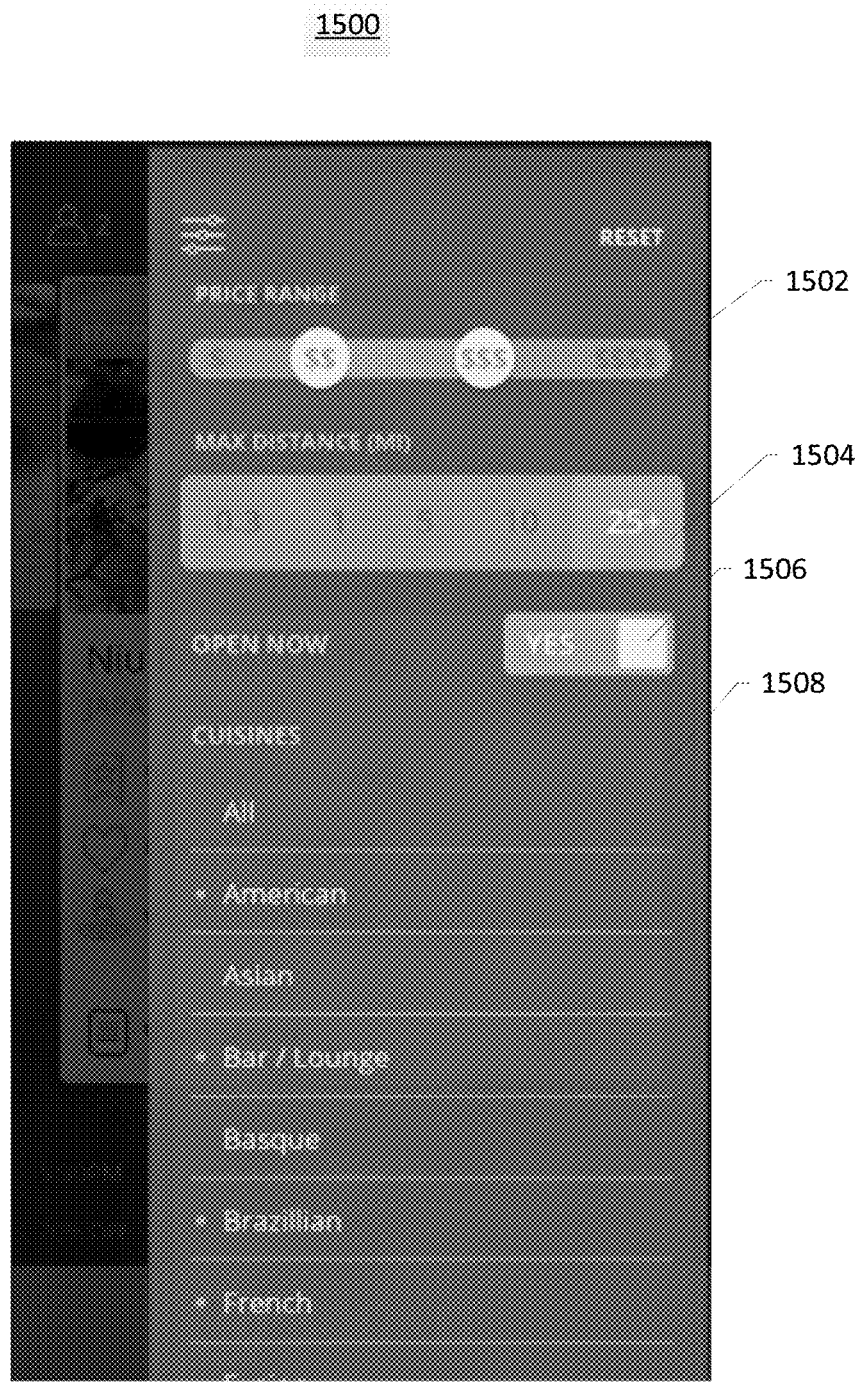
Figure 16:
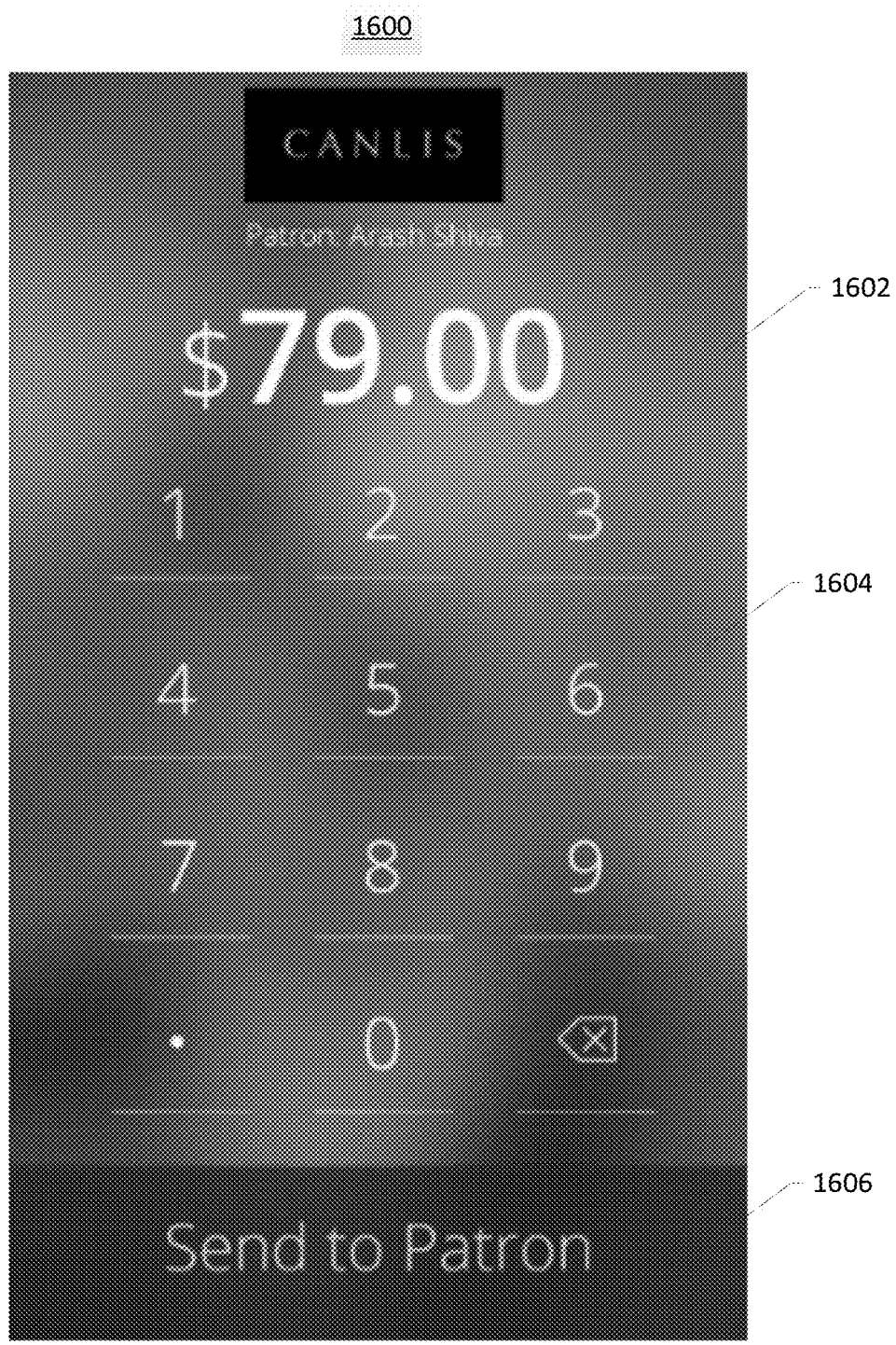
Figure 17:
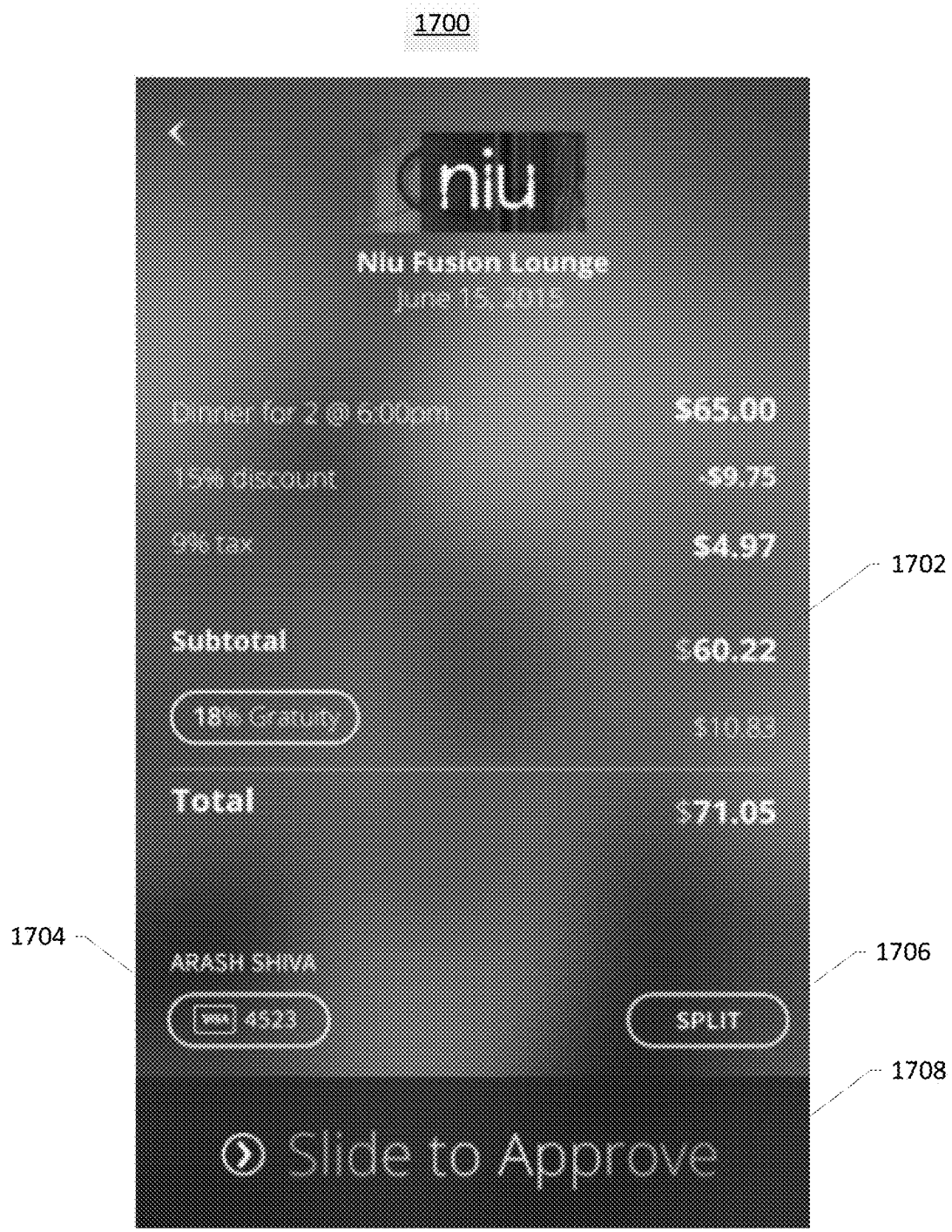

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of an example of circuitry in accordance with some embodiments;

FIG. 3 shows an example of a method 300 for providing a multi-level tiered graphical user interface (or "mGUI," as used herein) in accordance with some embodiments;

FIG. 4 shows an example of an mGUI in accordance with some embodiments;

FIG. 5 shows an example of a level of an mGUI in accordance with some embodiments;

FIG. 6 shows an example merchant interface implemented using an mGUI in accordance with some embodiments;

FIG. 7 shows an example of a method for dynamically updating a merchant interface implemented as an mGUI, in accordance with some embodiments;

FIG. 8 shows an example of a merchant interface in accordance with some embodiments;

FIG. 9 shows an example of a calendar management interface in accordance with some embodiments;

FIG. 10 shows an example of a slot management interface in accordance with some embodiments;

FIG. 11 shows an example of a slot interface, in accordance with some embodiments;

FIG. 12 shows an example of an electronic marketing communication in accordance with some embodiments;

FIG. 13 shows an example of a booking interface in accordance with some embodiments;

FIG. 14 shows an example of a booking confirmation interface in accordance with some embodiments;

FIG. 15 shows an example of a filter interface in accordance with some embodiments;

FIG. 16 shows an example of a send tab display in accordance with some embodiments; and FIG. 17 shows an example of a payment interface in accordance with some embodiments.

DETAILED DESCRIPTION

Embodiments now will be described more fully hereinafter with reference to the accompanying drawings, in which some, but not all embodiments are shown. Indeed, embodiments of the invention may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Where techniques are described herein with method flowcharts, it is appreciated that the steps of a method may not necessarily be performed in the order shown. Furthermore, in various embodiments, some or all of the steps of a method flowchart may not necessarily be performed.

Overview

Some embodiments may provide for a system capable of providing merchant availability management via a merchant interface implemented as an mGUI. The system may be configured to provide scheduling of merchant availability slots, real-time monitoring of slot usage and availability, and dynamic real-time modification of slot availability or properties. The system may be further configured to provide promotions of merchants to consumers based on slot availability. A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences (or "item(s)" as used herein) defined by the promotion. For example, a promotion may specify that for a $25 accepted value paid by the consumer, the consumer may receive $50 toward a meal at particular restaurant merchant.

A promotion may be defined by and/or be associated with one or more "promotion parameters." Example promotion parameters may include an accepted value (e.g., a cost to purchase the promotion), a promotional value (e.g., the value of the resultant instrument beyond the accepted value), and/or the associated item or items of the promotion.

A "merchant" or "provider" may include, but is not limited to, a merchant, provider of a promotion, business owner, consigner, shopkeeper, tradesperson, vender, operator, entrepreneur, agent, dealer, organization or the like that is in the business of a providing a good, service and/or experience to a consumer, facilitating the provision of a good, service or experience to a consumer and/or otherwise operating in the stream of commerce.

In some embodiments, the system may be configured to provide one or more "electronic marketing communications" of a promotion to consumers. An "electronic marketing communication," as used herein, may include a communication, a display, or other perceived indication, such as an e-mail, text message, application alert, mobile application, other type of electronic interface or distribution channel and/or the like, of one or more promotions.

Some embodiments may provide for improved techniques for consumer interaction with a promotion and marketing system, including streamlined consumer interfaces and consumer input gestures for triggering commands with the system.

Exemplary System Architecture

FIG. 1 shows an example system 100 in accordance with some embodiments. System 100 may include promotion and marketing system 102 (or "system 102"), network 104, consumer device 106, and merchant device 108. System 102 may be communicably connected with consumer device 106 and merchant device 108 via network 104. System 102 may include server 114 and database 116.

Server 114 may include circuitry, networked processors, or the like configured to perform some or all of the server-based processes described herein and may be any suitable network server and/or other type of processing device. For example, the server 114 may be configured to generate an mGUI and provide the mGUI to a merchant device 108 (e.g., in the form of a merchant interface) or a consumer device 106 (e.g., in the form of a consumer interface). The server 114 may be further configured to facilitate networked slot scheduling, consumer account management, sending of electronic marketing communications including promotions, tab/payment management, etc. In some embodiments, system 102 may function as a "cloud" with respect to the consumer device 106 and/or merchant device 108. In that sense, server 114 may include several servers performing interconnected and/or distributed functions. To avoid unnecessarily overcomplicating the disclosure, server 114 is shown and described herein as a single server.

Database 116 may be any suitable network storage device configured to store some or all of the information described herein. For example, database 116 may be configured to store consumer account data (e.g., profile, payment accounts, etc.), merchant information, item data, promotion data, mGUI data, slot data, calendar data, and/or among other things. As such, database 116 may include, for example, one or more database systems, backend data servers, network databases, cloud storage devices, etc. To avoid unnecessarily overcomplicating the disclosure, database 116 is shown and described herein as a single database.

In some embodiments, system 102 may be configured to provide a promotion and marketing service to consumer device 106. A promotion and marketing service, as used herein, may include a service that is accessible via one or more computing devices (e.g., consumer device 106) and may be operable to provide example promotion and/or marketing services on behalf of one or more merchants that are offering one or more instruments that are redeemable for goods, services, experiences and/or the like. The promotion and marketing service may be further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. In addition and/or alternatively, consumer device 106 may be a stationary device such as a desktop computer, workstation, point-of-sale device, or the like.

Merchant device 108 may be associated with a merchant, and may be located at a merchant shop and/or other location. Although a single merchant device 108 is shown, system 100 may include any number of merchant devices that may be associated with various other merchants.

In some embodiments, merchant device 108 (e.g., processing circuitry) may be configured to generate and/or display a merchant interface to a display (e.g., or a touch screen display that is configured to receive tactile inputs and output visual data) of the merchant device 108. The merchant interface may be configured to provide merchant availability management as discussed herein. The input data may be generated via one or more input devices or interfaces, including a touch screen, or a touch screen display configured to receive tactile user inputs. In some embodiments, the touch screen may include an integrated or separate pressure sensor configured to detect different touch pressure levels (e.g., force touch or 3D touch). As discussed in greater detail below, various types of predefined input data, may be associated with various commands that allow the merchant to interact with the system 102 and/or the promotional and marketing service, or consumer devices 106 using an mGUI.

In some embodiments, merchant device 108 may be configured to provide point-of-sale (POS) functionality for the merchant, such as at the merchant's shop. Furthermore, merchant device 108 may be a stationary and/or mobile device. In some embodiments, system 102 may be configured to receive promotion data from merchant device 108 indicating a promotion for goods, experiences and/or services (or "items" as used herein) and/or one or more promotion parameters of the promotion (e.g., target audience, timing, accepted value, promotional value, residual value, etc.). System 102 may then generate and/or provide one or more electronic marketing communications for the promotion to consumer device 106, which may be redeemed with the merchant.

FIG. 2 shows a schematic block diagram of example circuitry 200, some or all of which may be included in system 102, server 114, database 116, consumer device 106, and/or merchant device 108. In accordance with some example embodiments, circuitry 200 may include various means, such as one or more processors 202, memories 204, communications modules 206, and/or input/output modules 208.

In some embodiments, such as when circuitry 200 is included in server 114 or merchant device 108, merchant interface module 210 may also or instead be included. The merchant interface module 210 may be configured to facilitate the functionality discussed herein with respect to providing a merchant interface. In another example, where merchant interface module 210 is included with server 114, the module may be configured to receive the merchant input data and to process the merchant input data. Similarly, circuitry 200 may include a consumer interface module 212, which may be included in the server 114 or consumer device 106 to provide the user interfaces discussed herein with respect to the consumer device 106.

As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments discussed herein while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. In addition or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, pressure sensor for the touch screen, keyboard, button, click wheel, mouse, joystick, an image capturing device (e.g., a camera), motion sensor (e.g., accelerometer and/or gyroscope), microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, merchant interface module 210 or consumer interface module 212 may also or instead be included and configured to perform the functionality discussed herein related providing a merchant and consumer interfaces respectively. In some embodiments, some or all of the functionality of module 210 and/or 212 may be performed by processor 202. In this regard, some or all of the example processes and algorithms discussed herein can be performed by at least one processor 202, merchant interface module 210, and/or consumer interface module 212. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Multi-Level Tiered Graphical User Interfaces for Mobile Devices

FIG. 3 shows an example of a method 300 for providing a multi-level tiered graphical user interface (or "mGUI," as used herein), in accordance with some embodiments. Method 300 may begin at 302 and proceed to 304, where processing circuitry (e.g., of a central system server, merchant device, or consumer device) may be configured to generate a multi-level graphical user interface (mGUI) including tiered levels. FIG. 4 shows an example of an mGUI 400, in accordance with some embodiments. The mGUI 400 may provide a more intuitive and efficient user interface for data organization and management on a mobile device interface. The mGUI 400 may include a plurality of tiered levels, such as tier 1 level 402, tier 2 level 404, and tier 3 level 406. Here, tier 1 level 402 is the highest level, with tier 2 level 404 being the second highest level, and tier 3 level 406 being the third highest level. Each level 402, 404, or 406 may include one or more level objects that provide references to a lower tiered level. For example, level 402 includes objects 408, 410, and 412.

FIG. 5 shows an example of a level 500 of an mGUI, in accordance with some embodiments. The level 500 may include empty object regions 502 defining locations where objects (e.g., objects 504 and 506) may be added or removed. Level 500 may also include a level interface 508, which may be an object interface for a higher tier level object. The objects 504 and 506 of the level 500 may provide references to a lower level, which may also include interfaces for the objects 504 and 506. The interface 508 may represent a data manipulator, allowing the user to set various parameters of data represented by the level 500 (e.g., via touch screen user input).

The mGUI may be used to provide a structured interface for intuitively manipulating data that is organized in a hierarchy on a mobile device display and touch screen. For example, the mGUI may be used as part of a merchant interface for managing merchant availability in real time. FIG. 6 shows an example merchant interface 600 implemented using an mGUI, in accordance with some embodiments. Merchant interface 600 may include tiered levels 602, 604, 606, and 608.

The highest tier level 602 may include a calendar management interface configured to provide for user manipulation of calendar and scheduling data of the merchant. The level 602 may further include objects 610, each representing a period of time. The periods of time objects may each define sub-objects of the calendar, such as a day, work shift, hour, etc. Each time period object 610 may provide a reference to a level 604 and associated slot management interface for the time period object 610.

The next tier level 604 may include a slot management interface configured to provide for user manipulation of merchant availability slots within a time period. The level 604 may include one or more objects represented by slots 612, each defining an availability slot. Each slot object 612 may provide a reference to a level 606 and associated tab interface for the slot object 612. For example slot 616 provides a reference to level 606 in the depicted embodiment. With reference to FIG. 5, when the level 500 is implemented as a slot management interface level 604, the empty object regions 502 may represent empty slots of merchant availability (e.g., tables, employees, etc.) that can be populated with object representing availability. The slots 504 and 506 may represent the available slots within the time period. The interface 508 may represent a slot configurator, allowing the user to set various parameters of the time period defined by the level 500. Each slot 504 or 506 may provide a reference to a lower tier level that may include some or all of the features of the level 500. For example, the lower level tier associated with slot 504 may include a tab interface for the slot 504, including objects representing consumer accounts that have opened a tab and taken up the availability (e.g., table) represented by slot 504.

Returning to FIG. 6, tier level 606 may include a tab interface 606 configured to provide for user manipulation of a tab associated with a slot 612. The tab interface 606 may be configured to provide a real-time availability status of the slot, such as based on tracking live point-of-sale data that is being generated by a merchant point-of-sale device associated with the merchant. Some example functionalities of the tab interface may include adding items to the tab, associating consumers or consumer accounts with the tab, and processing a financial transaction for the tab. The tab interface 606 may include objects represented by consumer accounts 614. Each consumer account 614 may represent a user, such as a user that is seated at a table represented by the slot 612. Each consumer account object 614 may provide a reference to the level 608 and associated consumer account management interface for the consumer account object 614.

The lowest tier level 608 of the merchant interface 600 may include a consumer account interface. The consumer account interface may provide for user access and/or manipulation of consumer account data. As such, using the merchant interface 600, a user can manage merchant availability, such as by predefining slots (e.g., using the calendar management/slot management interfaces), and may add/remove slots in real-time, and may also facilitate point-of-sale functionality and consumer account management for users being served within the slots.

Returning to FIG. 3, at 306, the processing circuitry may be configured to display a first level of the mGUI on a display of a mobile device, the first level including first level objects. The display may include a touch screen display configured to receive tactile inputs. "First," "second," "third," etc. as used herein, refer to particular levels and are not necessarily indicated of tier level within the mGUI. The first level may be defined as the current level that is displayed on the display. FIG. 10 shows an example of a slot management interface 1000, in accordance with some embodiments. The slot management interface 1000 may be an example of the "first level" of the mGUI displayed at 306. For a time period 1012, the slot management interface 1000 may include empty slot regions 1002 each configured to receive a slot, such as slots 1004, 1006, or 1008. Each time period 1012 may also include a preview indicator of available slots (e.g., 3 for the time period 1012).

As discussed in greater detail below, the slot management interface 1000 may be configured to provide convenient adjustment of (e.g., daily) availability in an ad hoc fashion. In some embodiments, the processing circuitry may be further configured to make suggestions for availability slot requirements, such as based on a predictive model for yield management generated based on historical transaction data. In some embodiments, the slot management interface 1000 may further include a calendar button 1010 for accessing the higher level calendar interface via a single tap (e.g., as an alternative to a multi-touch expand as discussed in greater detail below).

With returned reference to FIG. 3, at 308, the processing circuitry may be configured to monitor a touch screen of the mobile device for user inputs while the first level is displayed on the display. The monitoring may include monitoring receipt, via the touch screen display, of tactile user inputs. The touch screen may be any suitable touch screen capable of multi-touch functionality, such as a capacitive touch screen, resistive touch screen, or acoustic touch screen. The touch screen may overlay the display, and thus the user may interact with the first level of the mGUI displayed on the display with the touch screen. In some embodiments, the touch screen may be integrated (e.g., as a layer) with the display as a touch screen display.

At 310, the processing circuitry may be configured to determine whether the (e.g., tactile) user inputs indicates or corresponds with a predefined input. The predefined inputs may provide for various functionalities with respect to the mGUI, such as traversing the mGUI or changing the structure of the mGUI. The predefined inputs may include a multi-touch expand for traversing to a lower level, a multi-touch pinch for traversing to a higher level, a single touch for creating a new object within a level (and thus a new lower level interface associated with the object), and a drag and drop for removing an object from a level.

In response to determining that the user input indicates a multi-touch expand, method 300 may proceed to 312, where the processing circuitry may be configured to determine a first level object from the multi-touch expand. The multi-touch expand may be characterized by two starting touch points, and two ending touch points, where the distance between the ending touch points is greater than the distance between the starting touch points. An object may be selected based on starting touch points of the multi-touch expand. With reference to FIG. 4, for example, the processing circuitry may be configured to determine selection of the object 414 within level 404 based on the starting points 416 and 418 of the multi-touch expand. Although a horizontal axis expand is shown in FIG. 4, the multi-touch expand is not necessarily limited to the horizontal axis.

At 314, the processing circuitry may be further configured to display a second level (lower tier) of the mGUI within the display including a first level object interface for the selected first level object. With reference to FIG. 4, the level 406 may represent the second level that is lower tier than the level 404, and may be displayed on the display. As such, the multi-touch expand may define a traversal from a higher tier level to a lower tier level including an object interface of a selected object within the higher tier level.

For example, the lower tier level 406 may include an object interface for the selected higher tier object 414. Thus the mGUI may include a tier 3 level object interface for each tier 2 object 414, 420 and 422. Similarly, the tier 2 level 404 may represent an object interface for the tier 1 level object 410. Each tier 1 level object 402 may also include an associated tier 2 level, which may also be accessed based on a multi-level expand touch screen user input.

When the first level is the merchant slot interface (e.g., as shown in FIG. 10), the lower tier level to the merchant slot interface may include a slot interface associated with a particular slot. FIG. 11 shows an example of a slot interface 1100, in accordance with some embodiments. The slot interface 1100 may provide management of the selected slot, such as for handling reservations or bookings. Thus, the slot interface 1100 may include an indication of consumers 1102 for each time period 1104 associated with the slot, and a promotion or discount 1106 associated with the slot. Based upon user selection of a time period (e.g., based on a side swipe), the slot interface 1100 may provide for options for interfacing the consumer and/or consumer account associated with the slot. Some example functionalities may include charging the consumer (e.g., creating a tab, shopping cart, or the like), messaging the consumer (e.g., to send a promotion or other merchant message), or scheduling administrative options such as a no show button indicating that the reserving consumer did not fill the slot availability as scheduled.

Returning FIG. 3, at 310, in response to determining that the user input indicates a multi-touch pinch while the first level (e.g., tier 2 level 404) is displayed on the display, method 300 may proceed to 316, where the processing circuitry may be configured to display a third level (higher tier) of the mGUI within the display including a third level object providing a reference to the first level.

The multi-touch pinch may be characterized by two starting touch points, and two ending touch points, where the distance between the starting touch points is greater than the distance between the ending touch points. With reference to FIG. 4, for example, the processing circuitry may be configured to determine a selection for traversal to a higher tier level based on the multi-touch pinch defined by the starting points 424 and 426 within the level 404. In response, the higher tier level 402 may be displayed to the touch screen display of the mobile device. Although a horizontal axis expand is shown in FIG. 4, the multi-touch pinch is not necessarily limited to the horizontal axis.

As such, the multi-touch expand and pinch provide intuitive and improved ways for traversing up and down the levels of the mGUI using a touch screen. With reference to the merchant interface 600 of FIG. 6, for example, the "first level" may be the slot management interface. Based on a multi-touch expand with starting points within a slot 612 of the level 604, the lower tier tab interface of level 606 may be displayed. Based on a multi-touch pinch within the level 604, the higher tier calendar management interface of the level 602 may be displayed.

FIG. 9 shows an example of a calendar management interface 900, in accordance with some embodiments. The calendar management interface 900 may be configured to provide for slot time period definition. For example, the user may be allowed to predefine regular patterns of availability for consumer booking or use. The calendar management interface 900 may include a day setter 902 for specifying days of the week, a slot range setter for setting the time range (e.g., hours of operation) within the specified days, a slot size setter for setting a default number of slots per time period, and a default promotion value setter for setting a default promotion value of promotions.

Returning to 310 of FIG. 3, in response to determining that the user input indicates a single touch while the first level (e.g., tier 2 level 404) is displayed on the display, method 300 may proceed to 318, where the processing circuitry may be configured to determine a selected empty object region. With reference to FIG. 5, empty object region 502*a* may be determined as being selected based on the location of the single touch being within the empty object region 502*a*.

At 320, the processing circuitry may be configured to add a first level object to the empty object region. For example, the object 510 may be added to the empty object region 502*a* as shown in FIG. 5 as an object of the level 500. As such, the mGUI may provide for "one-click" additions of new objects. In some embodiments, the processing circuitry may be further configured to generate a lower tier level of the mGUI associated with the new object. The lower tier level may be accessed using the new object, such as based on a multi-touch expand as discussed above at 312 and 314.

With reference to the merchant interface 600 of FIG. 6, where the "first level" may be the slot management interface, a new slot 612 may be added to the slot management interface of level 604 based on a single touch within an empty slot region of the level 604.

Returning to 310, in response to determining that the user input indicates a drag and drop while the first level (e.g., tier 2 level 404) is displayed on the display, method 300 may proceed to 322, where the processing circuitry may be configured to determine a selected first level object for removal. The selected object may be determined based on the starting point of the drag and drop. In some embodiments, the drag and drop may further be defined by an ending point. To avoid unintended commands, the ending point for a successfully object removal may be defined as being outside of the open object region 502 (as shown in FIG. 5).

At 324, the processing circuitry may be configured to remove the selected first level objected from the first level. With reference to FIG. 5, the object 504 may be determined as being selected from removal based on the drag and drag including a starting point within the object 504. As such, objects may be dynamically removed from a level. Similarly, the associated lower level and interface of the object may also be removed from the mGUI when the object is removed. In some embodiments, the drag and drop user input may also be used to move an object to a different empty object region, such as based on the endpoint (lift off point) of the drag and drop being located within an empty object slot region. In another example, two slots may be exchanged based on a drag and drop, such as when the endpoint is located at another object or occupied object region.

With reference to the merchant interface 600 of FIG. 6, where the "first level" may be the slot management interface, an existing slot 612 may be removed from the slot management interface of level 604 based on a drag and drop a with starting point at the existing slot 612.

The processing circuitry may be configured to continue to monitor the touch screen for user inputs for traversing levels, adding objects/levels, and removing objects/levels. The discussion in method 300 with respect to the "first level" may be applicable to other levels of the mGUI.

In various embodiments, other predefined touch screen user inputs may be used. For example, a high pressure touch (e.g., force touch or 3D touch) or a press and hold user input on an object (e.g., a slot) may provide for quick management of certain object parameters. For example, the user may be able to select a custom promotional value for a particular slot and time based on the high pressure touch or press and hold on the slot within a merchant slot management interface. In another example, the multi-touch pinch to traverse the mGUI may be changed, such as using a single touch on an existing object. Method 300 may proceed to 326 and end.

FIG. 7 shows an example of a method 700 for dynamically updating a merchant interface implemented as an mGUI, in accordance with some embodiments. The levels and user interfaces referenced by objects may be dynamically changed based on various monitored electronic inputs. The monitoring and dynamic modification may take place in the background, or otherwise without requiring user inputs.

Method 700 may begin at 702, and proceed to 704, where processing circuitry (e.g., of a central system server, merchant device, or consumer device) may be configured to generate a merchant interface including an mGUI. The discussion at 304 of method 300 may be applicable at 704. The merchant interface may include a plurality of levels, such as levels 602 (e.g., the calendar management interface) and 604 (e.g., the slot management interface) of the merchant interface 600 shown in FIG. 6.

At 706, the processing circuitry may be configured to display a first level of the mGUI on the display of the mobile device. The first level may include a slot management interface and first level objects each representing a slot, such as the level 604 of the merchant interface 600 shown in FIG. 6. The discussion at 306 of method 300 may be applicable at 706.

The slot management interface may be configured to provide real-time slot availability management. As such, the slot management interface may be displayed in response to the user access on the mobile device, such as by a merchant employee or other operator that is managing the operations of the merchant shop.

At 708, the processing circuitry may be configured to monitor slot availability based on live point-of-sale data. The live point-of-sale data may be generated by a merchant point-of-sale device associated with the merchant, and thus the monitoring may provide for optimized management of last minute/ad hoc slot availability. The point-of-sale device may be the same device that is providing the mGUI, or may be a separate device configured to provide point-of-sale functionality (e.g., tab creation, management, etc.), generate the point-of-sale data in the course of handling transactions, and provide the point-of-sale data to the processing circuitry. The live point-of-sale data may indicate slot availability, such as based on whether a tab has been created for the slot. Similarly, the live point-of-sale data may indicate that a slot has become available, such as subsequent to the closing of a tab. Additional details regarding table and tab management based on consumer device interactions, applicable in some embodiments, are discussed in U.S. patent application Ser. No. 13/875,019, titled "Consumer Device Based Point-of-sale," filed May 1, 2013, which is incorporated by reference in its entirety. In some embodiments, the monitoring may also include monitoring reservation or booking data, such as may be created by a consumer on a consumer device to schedule future use of a particular slot.

At 710, the processing circuitry may be configured to display an indication of whether a slot is available within the slot management interface. With reference to FIG. 6, for example, slots may be designated as "occupied" or "available" based on the tracked availability status. In another example shown in FIG. 6, a slot may be designated as occupied based on color (e.g., red instead of green) and/or consumer name (e.g., "A. Shiva"). The indication may provide a convenient real-time reference for slot availability, and without requiring that the user navigate through the mGUI (e.g., to the lower tier slot interface). Furthermore, when a slot is occupied, various functionalities may be locked out, such as the remove slot object functionality.

At 712, the processing circuitry may be configured to monitor for user inputs to the touch screen. At 714, the processing circuitry may be configured to determine whether the user input indicates a multi-touch expand (or other lower tier traversal command) of the slot. In response to determining that the user input fails to be the multi-touch expand, method 700 may return to 712, where the processing circuitry may be configured to continue monitoring for user inputs to the touch screen. In response to determining that the user input indicates the multi-touch expand at 716, method 700 may proceed to 716, where the processing circuitry may be configured to determine a selected slot from the multi-touch expand. The discussion at 308, 310, and 312 of method 300 may be applicable at 712, 714 and 716.

At 718, the processing circuitry may be configured to determine whether the selected slot is available (e.g., occupied by a consumer, or not). The availability may be determined based on monitoring live point-of-sale data as discussed above. As discussed in greater detail below, the selection of the selected slot (e.g., based on multi-touch expand) may trigger the display of a different "slot interface" within the lower tier level of the mGUI, such as depending on the real-time status of the slot.

In response to determining that the selected slot is available (e.g., not occupied), method 700 may proceed to 720, where the processing circuitry may be configured to display a slot interface including a promotion management interface for the selected slot. FIG. 8 shows an example of a merchant interface 800, in accordance with some embodiments. Similar to the merchant interface 600, merchant interface 800 may include a calendar management interface level 802 and a slot management interface level 804. In some embodiments, the processing circuitry may be further configured to generate the promotion management interface if the promotion management interface for the associated slot has not been created.

Rather than the tab interface 606, the slot interface includes a promotion management interface 806. The promotion management interface 806 may provide the creation of promotions associated with the selected slot. The promotion management interface level 804 may be displayed in response to selection of the available slot 808.

Returning to FIG. 7, at 722, the processing circuitry may be configured to receive user inputs defining one or more promotion parameters while the promotion management interface is displayed on the display. The promotion parameters may define the characteristics of the promotion, and may include an accepted value (e.g., a cost to purchase the promotion), a promotional value (e.g., the value of the resultant instrument beyond the accepted value), and/or the associated item or items of the promotion. The promotion parameters may further define a temporal restriction, such as a redemption time and/or broadcast time (e.g., time the promotion is sent to a consumer device) that is restricted to the time period associated with the slot. The promotion management interface may be configured to allow the user to select various promotion parameters using the touch screen.

In some embodiments, the one or more promotion parameters may be programmatically determined. For example, the temporal restriction to the time slot may be programmatically determined based on the selected slot (e.g., and the mGUI hierarchy), and thus some or all of the promotion parameters may be determined by the processing circuitry in alternative to user definition. In another example, the underlying item of the promotion may be programmatically determined, such as based on matching candidate items offered by the merchant to consumer preferences (e.g., as defined by consumer accounts/profiles).

At 724, the processing circuitry may be configured to provide a promotion to a consumer device in accordance with the one or more promotion parameters that is time restricted to a time period associated with the slot. For example, the promotion may be created in accordance with the promotion parameters, and may be provided to the consumer device 106, such as from the consumer device or from the central system 102 (e.g., via the network 104). As such, the merchant can dynamically define promotions for available, unused slots, in real-time based on monitoring slot availability, all of which may be provided by the merchant interface. Furthermore, the temporal restrictions for promotion redemption may be advantageously used to more efficiently allocate merchant device resource usage (e.g., in terms of power, networking, and/or processing resources). As such, the point-of-sale data processing and data transfers (e.g., to the central system for consumer account updates/purchase tracking) via the network 104 may be peak shifted from periods of high traffic to periods of low traffic.

The promotion may be provided as an electronic marketing communication to the consumer device using any suitable communication channel, such as email, short messenger service (SMS) text, application alert, mobile push alert, social networking newsfeed, etc. FIG. 12 shows an example of an electronic marketing communication 1200, in accordance with some embodiments. The electronic marketing communication 1200 is an example of a mobile push alert indicating a promotion that may be provided to a mobile consumer device. The electronic marketing communication 1200 may include a message 1202 including promotion parameters such as the underlying item (e.g., dinner at a restaurant) and a promotional value (e.g., 15% off). The message 1202 may also include data associated with the slot as determined based on the mGUI data, such as live slot availability within the time period (e.g., 5 spots left for dinner tonight). The message may further include a selectable link or other reference to a booking interface that may be provided to the mobile consumer device, such as by launching a mobile application and/or a webpage on a mobile browser.

FIG. 13 shows an example of a booking interface 1300, in accordance with some embodiments. The booking interface 1300 may be provided the consumer device to facilitate consumer reservation of a slot. The booking interface 1300 may include a promotion message 1302, including a promotion image and merchant data (e.g., name, genre, price range, reviews, properties, menu, ranking, etc.), a distance from consumer indicator 1304, a time period and promotional value indicator 1306, and a booking button 1308. The distance from consumer indicator 1304, which may indicate the distance of the merchant shop from the consumer device (e.g., as determined based on global positioning systems (GPS), cell-tower triangulation, local proximity-based wireless connections (e.g., indicating consumer presence at a predefined location), consumer device input, or any other suitable technique. The time period and promotion value indicator 1306 which may allow the user to select from available time periods (e.g., including an available slot) based on the associated promotional value (e.g., 15% off for the 6:00-6:30 PM time period). In some embodiments, swiping horizontally across the time period and promotion value indicator 1306 may allow the user to select from different time periods. The booking button 1308 may be a selectable button which may trigger the booking of the slot for the specified time period. For example, the booking button may result in the sending of reservation/booking data to the central system or a merchant device, which may be used as real time electronic data for dynamically updating the merchant interface.

In some embodiments, the booking button 1308 may be time restricted to provide for a limited time in which the booking may be completed and the promotional value received. The booking button 1308 may include a countdown timer (e.g., 58 seconds) providing an indication of the amount of time remaining in which the booking can be completed. In some embodiments, subsequent to expiration of the countdown timer, the booking may still be performed. However, the promotional value may be reduced or eliminated.

In some embodiments, the booking interface 1300 may be configured to provide a listing of promotions. The listing of promotions may be associated with a single merchant, or may be associated with multiple different merchants. The listing of promotions may be ranked or ordered, such as based on a relevance algorithm that compares promotion parameters or other characteristics of the promotion (e.g., reviews, distance to consumer, etc.) to consumer account data (e.g., profiles, characteristics, preferences, likes, hobbies, group membership, past bookings or purchases, etc.). The consumer may swap through the listing or promotions, such as by performing a swipe across the promotion message 1302. As such, the booking interface 1300 may provide for the swapping or changing of the displayed promotion from the ranked or ordered listing, and for the selection of a one or more promotions from the listing.

In some embodiments, the booking interface 1300 may further include an invite user button 1310 and a filter button 1312. The invite user button 1310 may be configured to allow the user to invite other users, or otherwise specify the number of users in a group. The selection of promotions may be further based on the party size. For example, slots that cannot accommodate or are otherwise unsuitable for hosting the specified number of users may be excluded from the selected promotions. The filter button 1312 may allow the user to define other parameters for promotion and/or merchant relevance, as discussed in greater detail below.

FIG. 14 shows an example of a booking confirmation interface 1400, in accordance with some embodiments. The booking confirmation interface 1400 may be provided to the consumer device, such as in response to the consumer selecting the booking button 1308 within the booking interface 1300. The booking confirmation interface 1400 may include booking confirmation indicator 1402, a change booking button 1404, a pay bill button 1406, and an invite user button 1408. The change booking button 1404 may provide for the modification of booking data, such as by returning the user to a booking interface or the like. The pay bill button 1406 may provide for the payment of a tab associated with the booking, such as by allowing the consumer to provide payment data or otherwise authorizing a payment (e.g., based on payment data stored at the central system). The invite user button 1408 may be configured to provide a reference to an interface for adding users to the slot. The users that are invited and accepted for the slot may be provided to the merchant interface, such as based on consumer account objects of a tab interface, or a consumer account management interface, as shown in FIG. 6. In some embodiments, the invited users may also receive the booking data, such as the time period, merchant, location, etc.

FIG. 15 shows an example of a filter interface 1500, in accordance with some embodiments. The filter interface 1500 may be displayed on the consumer device, such as in response to selection of the promotion filter button 1312 within the booking interface 1300. The filter interface 1500 may include a price range selector 1502, a max distance selector 1504, an open now selector 1506, and a type selector 1508. The price range selector 1502 allows the consumer to pick a price range (e.g., from $ to $$$$) for the merchant and/or item. The max distance selector 1504 allows the consumer to specify a maximum distance from the consumer that the merchant shop is located, creating a geofence filter centered on the consumer device location. The open now selector 1506 allows the consumer to filter out merchants that are currently closed or have no available slots, or not, based on a toggle. The type selector 1508 allows the consumer to select one or more merchant or item types. For a restaurant merchant booking application, the type selector 1508 allows the consumer to select from different cuisine types.

Additional details with respect to online reservations, applicable in some embodiments, are discussed in U.S. patent application Ser. No. 13/839,414, titled "Online Ordering for In-shop Service," filed Mar. 15, 2013, which is incorporated by reference herein in its entirety.

Returning to 718 as shown in FIG. 7, in response to determining that the selected slot is unavailable, method 700 may proceed to display the slot interface for the selected slot including a tab management interface. The selected slot may provide a reference to tab management interface rather than the promotion management interface when the selected slot is unavailable (e.g., occupied or reserved by one or more consumers). The tab management interface may be configured to facilitate management of a tab associated with the selected slot. With reference to FIG. 6, the tab interface level 606 may be displayed in response to selection of the occupied slot 616.

With returned reference to FIG. 7, at 728, the processing circuitry may be configured to facilitate a transaction based on receiving user inputs (e.g., from the touch screen) defining transaction data while the tab management interface is displayed on the display. The transaction data may be an example of point-of-sale data that is generated by a point-of-sale device, and may include items, item costs, tax/tip costs, consumer payment data (e.g., account identifier, payment card data, etc.), etc.

FIG. 16 shows an example of a send tab display 1600, in accordance with some embodiments. The send tab display 1600 may be provided by the tab management interface to send a total cost to one or more consumer devices for payment authorization. The send tab display 1600 may include a total cost 1602, a total cost widget 1604, and a send tab button 1606. The total cost 1602 may be programmatically generated, such as based on item costs and other transaction data (e.g., tax, tip, etc.). The total cost widget

1604 may provide for manual entry or adjustment of the total cost. The sent tab button 1606 may be selected to send the total cost to a consumer device associated with a consumer account. When split the bill functionality is enabled, the total cost and/or a split amount may be provided to each consumer device.

In some embodiments, some or all of the user inputs for facilitating the transaction may be generated by the consumer device. For example, the consumer device may be configured to provide mobile device payments. FIG. 17 shows an example of a payment interface 1700, in accordance with some embodiments. The payment interface 1700 may include a tab 1702, payment data indicator 1704, a split the bill button 1706, and an approve payment button 1708. The tab 1702 may include details of the tab, such as total cost, promotional value, tax amount, tip, total, etc. The payment indicator 1704 may provide an indication of the payment account being charged. The approve payment button 1708 may provide for confirmation of the payment, and may be completed based on a horizontal swipe as indicated (e.g., "Slide to Approve").

The split the bill button 1706 may be configured to initiate splitting of the total amount among two or more users. For example, payment may be provided via payment accounts associated with consumer accounts of each user that is splitting the bill. Additional details with respect to programmatic bill splitting for mobile consumer device payments, applicable in some embodiments, are discussed in U.S. patent application Ser. No. 14/495,754, titled "Systems and Methods for Programmatically Grouping Consumers," and U.S. patent application Ser. No. 14/495,750, titled "Systems and Methods for Providing Shared Promotion Redemption," each filed Sep. 24, 2014, and each of which is hereby incorporated by reference in its entirety.

The transaction data may additionally or alternatively include reservation data. Here, facilitating a transaction may include booking the reservation based on the reservation data, and updating the merchant interface accordingly. In some embodiments, the transaction data may be provided to the central system, such as to facilitate consumer tracking, consumer account updates, and subsequent promotion matching.

In some embodiments, reservation data, transaction data, or other point-of-sale data may be used to provide merchant analytics. For example, the performance (e.g., in terms of conversion rate, conversion value, etc.) of a promotion, slot, period of time, etc. may be determined based on tracking data over time and analyzing the data. The merchant analytics may be provided to a merchant device for reporting. In another example, analytics may be used for providing promotion recommendations or inventory management.

In some embodiments, single interface level may be used for tab and promotion management. However, dynamically changing object reference levels based on tracking data may provide for reducing the number of user inputs needed to perform the suitable slot management functionality. Furthermore, the discussion herein with respect to dynamically changing slot object references of a slot management interface may also be applicable to other levels of an mGUI, or other types of interfaces different from a merchant interfaces implemented using the mGUI. Method 700 may then proceed to 730 and end.

Conclusion

Many modifications and other embodiments will come to mind to one skilled in the art to which the embodiments discussed herein pertain having the benefit of the teachings presented in the foregoing descriptions and the associated drawings. Therefore, it is to be understood that the embodiments contemplated herein are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile device, comprising:
a touch screen display configured to receive tactile user inputs; and
processing circuitry configured to:
 display a multi-level tiered graphical user interface (mGUI) on the touch screen display, wherein:
  a first level of the mGUI includes a slot management interface;
  the mGUI includes the first level and a second level;
  the first level includes one or more first level objects each representing a non-empty slot of one or more non-empty slots;
  the first level further includes one or more empty slot regions each representing an empty slot of one or more empty slots; and
  the second level is associated with one or more second level interfaces each associated with a first level object of the one or more first level objects;
 monitor receipt, via the touch screen display, of tactile user inputs; and
 in response to receiving tactile user inputs:
  determine, while the first level is displayed on the display, whether the tactile user inputs indicate a multi-touch expand input associated with a particular first level object of the one or more first level objects or a single touch associated with a particular empty slot region the one or more empty slots;
  in response to determining that the tactile user inputs indicate the multi-touch expand input:
   determine a non-empty slot associated with the particular first level object as a selected non-empty slot based on starting points of the multi-touch expand input; and
   display the second level of the mGUI within the touch screen display, wherein the second level includes a slot interface for the selected slot; and
  in response to determining that the tactile user inputs indicate the single touch:
   determine an empty slot associated with the single touch based on a touching point of the single touch as the selected empty slot;
   add a new first level object corresponding to the selected empty slot to the one or more first level objects; and
   add a new second level interface corresponding to the new first level object to the one or more second level interfaces.

2. The mobile device of claim 1, wherein the processing circuitry is further configured to, in response to receiving second tactile user inputs:
determine whether the second tactile user inputs indicate a multi-touch pinch while the second level is displayed on the touch screen display; and
in response to determining that the multi-touch pinch while the second level is displayed on the touch screen display, display the first level of the mGUI on the touch screen display.

3. The mobile device of claim 1, wherein the processing circuitry is further configured to:
   determine whether a third user input indicates a second multi-touch expand while the first level including the new slot is displayed on the touch screen display; and
   in response to determining that the third user input indicates the second multi-touch expand while the first level including new slot is displayed on the touch screen display:
      determine the new slot as a second selected slot from the first level objects based on second starting points of the second multi-touch expand; and
      display the second level of the mGUI within the touch screen display, wherein the second level includes a second slot interface for the second selected slot.

4. The mobile device of claim 1, wherein:
   the mGUI further includes a third level including a consumer account management interface;
   the slot interface within the second level includes one or more second level objects each representing a consumer account; and
   the processing circuitry is further configured to:
      determine whether a second user input indicates a second multi-touch expand while the second level is displayed on the touch screen display; and
      in response to determining that the second user input indicates the second multi-touch expand while the second level is displayed on the touch screen display:
         determine a selected consumer account from the one or more second level objects based on second starting points of the second multi-touch expand; and
         display the third level of the mGUI within the touch screen display, wherein the third level includes a consumer account management interface for the selected consumer account.

5. The mobile device of claim 1, wherein:
   the mGUI further includes a third level including a calendar management interface;
   the calendar management interface includes one or more third level objects each representing a time period; and
   the processing circuitry is further configured to, response to receiving a second user input:
      determine whether the second user input indicates a multi-touch pinch while the first level is displayed on the touch screen display; and
      in response to determining that the second user input indicates the multi-touch pinch while the first level is displayed on the touch screen display, display the third level of the mGUI within the touch screen display.

6. The mobile device of claim 1, wherein:
   the mGUI further includes a third level including a calendar management interface;
   the calendar management interface includes one or more third level objects each representing a time period; and
   the processing circuitry is further configured to, response to receiving a second user input:
      determine whether the second user input indicates a second multi-touch expand while the third level is displayed on the touch screen display; and
      in response to determining that the second user input indicates the second multi-touch expand while the third level is displayed on the touch screen display:
         determine a selected time period from the one or more third level objects based on second starting points of the second multi-touch expand; and
         display the first level of the mGUI within the touch screen display, wherein the first level includes a slot management interface for the selected time period.

7. The mobile device of claim 1, wherein each slot is associated with at least one of: a table or an employee.

8. The mobile device of claim 1, wherein the processing circuitry is further configured to:
   determine whether the slot is currently available based on monitoring live point-of-sale data; and
   display an indication of whether the slot is currently available within the slot management interface.

9. The mobile device of claim 8, wherein the processing circuitry is further configured to:
   in response to determining that the slot is currently available, display the slot interface for the slot including a promotion management interface;
   receive second user inputs defining one or more promotion parameters while the promotion management interface is displayed on the touch screen display; and
   provide a promotion to a consumer device in accordance with the one or more promotion parameters that is time restricted to a time period associated with the slot.

10. The mobile device of claim 8, wherein the processing circuitry is further configured to:
    in response to determining that the slot is currently unavailable, display the slot interface for the slot including a tab management interface; and
    facilitate a transaction based on receiving second user inputs defining transaction data while the tab management interface is displayed on the touch screen display.

11. The mobile device of claim 1, wherein the processing circuitry is further configured to, in response to receiving a second user input:
    determine whether the second user input indicates a drag and drop while the slot management interface of the first level is displayed on the touch screen display; and
    in response to determining that the second user input indicates the drag and drop while the first level is displayed on the touch screen display:
       determine a second selected slot from the one or more first level objects based on second starting points of the drag and drop; and
       remove a first level object representing the second selected slot from the slot management interface of the first level.

12. The mobile device of claim 1 further comprising a pressure sensor, and wherein:
    the slot management interface includes an empty slot region; and
    the processing circuitry is further configured to, in response to receiving a second user input from the touch screen and a pressure input from the pressure sensor:
       determine whether the second user input and the pressure input indicate a high pressure touch within the empty slot region of slot interface; and
       in response to determining that the second user input indicates the high pressure touch within the empty slot of slot interface, adding a new first level object representing a new slot to the empty slot region.

13. A system, comprising:
    a point-of-sale device comprising:

processing circuitry configured to generate point-of-sale data;

a mobile device comprising:
a touch screen display configured to receive tactile user inputs; and
processing circuitry configured to:
display a multi-level tiered graphical user interface (mGUI) on the touch screen display, wherein:
a first level of the mGUI includes a slot management interface, wherein the slot management interface indicates one or more slot availabilities;
the mGUI includes the first level and a second level;
the first level includes one or more first level objects each representing a non-empty slot of one or more non-empty slots;
the first level further includes one or more empty slot regions each representing an empty slot of one or more empty slots; and
the second level is associated with one or more second level interfaces each associated with a first level object of the one or more first level objects;
receive, via the point-of-sale device, point-of-sale data;
update the slot management interface based on received point-of-sale data;
monitor receipt, via the touch screen display, of tactile user inputs; and
in response to receiving tactile user inputs:
determine, while the first level is displayed on the display, whether the tactile user inputs indicate a multi-touch expand input associated with a particular first level object of the one or more first level objects or a single touch associated with a particular empty slot region the one or more empty slots; and
in response to determining that the tactile user inputs indicate the multi-touch expand input:
determine a non-empty slot associated with the particular first level object as a selected non-empty slot based on starting points of the multi-touch expand input; and
display the second level of the mGUI within the touch screen display, wherein the second level includes a slot interface for the selected slot; and
in response to determining that the tactile user inputs indicate the single touch:
determine an empty slot associated with the single touch based on a touching point of the single touch as the selected empty slot;
add a new first level object corresponding to the selected empty slot to the one or more first level objects; and
add a new second level interface corresponding to the new first level object to the one or more second level interfaces.

14. The system of claim 13, wherein the processing circuitry of the mobile device is further configured to, in response to receiving second tactile user inputs:
determine whether the second tactile user inputs indicate a multi-touch pinch while the second level is displayed on the touch screen display; and
in response to determining that the second tactile user inputs indicate the multi-touch pinch while the second level is displayed on the touch screen display, display the first level of the mGUI on the touch screen display.

15. The system of claim 13, wherein the processing circuitry of the mobile device is further configured to:
determine whether a third user input indicates a second multi-touch expand while the first level including the new slot is displayed on the touch screen display; and
in response to determining that the third user input indicates the second multi-touch expand while the first level including new slot is displayed on the touch screen display:
determine the new slot as a second selected slot from the first level objects based on second starting points of the second multi-touch expand; and
display the second level of the mGUI within the touch screen display, wherein the second level includes a second slot interface for the second selected slot.

16. The system of claim 13, wherein:
the mGUI further includes a third level including a consumer account management interface;
the slot interface within the second level includes one or more second level objects each representing a consumer account; and
the processing circuitry of the mobile device is further configured to:
determine whether a second user input indicates a second multi-touch expand while the second level is displayed on the touch screen display; and
in response to determining that the second user input indicates the second multi-touch expand while the second level is displayed on the touch screen display:
determine a selected consumer account from the one or more second level objects based on second starting points of the second multi-touch expand; and
display the third level of the mGUI within the touch screen display, wherein the third level includes a consumer account management interface for the selected consumer account.

17. The system of claim 13, wherein:
the mGUI further includes a third level including a calendar management interface;
the calendar management interface includes one or more third level objects each representing a time period; and
the processing circuitry of the mobile device is further configured to, response to receiving a second user input:
determine whether the second user input indicates a multi-touch pinch while the first level is displayed on the touch screen display; and
in response to determining that the second user input indicates the multi-touch pinch while the first level is displayed on the touch screen display, display the third level of the mGUI within the touch screen display.

18. The system of claim 13, wherein:
the mGUI further includes a third level including a calendar management interface;
the calendar management interface includes one or more third level objects each representing a time period; and
the processing circuitry of the mobile device is further configured to, response to receiving a second user input:
determine whether the second user input indicates a second multi-touch expand while the third level is displayed on the touch screen display; and in response to determining that the second user input indicates the second multi-touch expand while the third level is displayed on the touch screen display:
  determine a selected time period from the one or more third level objects based on second starting points of the second multi-touch expand; and
  display the first level of the mGUI within the touch screen display, wherein the first level includes a slot management interface for the selected time period.

\* \* \* \* \*